United States Patent
Shimomura et al.

(10) Patent No.: US 11,219,066 B2
(45) Date of Patent: *Jan. 4, 2022

(54) WIRELESS COMMUNICATIONS SYSTEM, BASE STATION, TERMINAL, AND PROCESSING METHOD

(71) Applicant: FUJITSU LIMITED, Kawasaki (JP)

(72) Inventors: Tsuyoshi Shimomura, Yokohama (JP); Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 72 days.

This patent is subject to a terminal disclaimer.

(21) Appl. No.: 16/596,378

(22) Filed: Oct. 8, 2019

(65) Prior Publication Data
US 2020/0045740 A1 Feb. 6, 2020

Related U.S. Application Data

(63) Continuation of application No. 15/485,641, filed on Apr. 12, 2017, now Pat. No. 10,517,117, which is a
(Continued)

(51) Int. Cl.
*H04W 74/08* (2009.01)
*H04W 56/00* (2009.01)
(Continued)

(52) U.S. Cl.
CPC ....... *H04W 74/0816* (2013.01); *H04W 16/14* (2013.01); *H04W 16/28* (2013.01);
(Continued)

(58) Field of Classification Search
None
See application file for complete search history.

(56) References Cited

U.S. PATENT DOCUMENTS

| 7,068,677 B1 | 6/2006 | Arai et al. |
| 2006/0221927 A1 | 10/2006 | Yamada et al. |

(Continued)

FOREIGN PATENT DOCUMENTS

| JP | 11-127479 A | 5/1999 |
| JP | 2006-287463 A | 10/2006 |

(Continued)

OTHER PUBLICATIONS

Examination Report issued by the Patent Office of India for corresponding Indian Patent Application No. 201737013209, dated Jan. 6, 2021, with a partial English translation.

(Continued)

*Primary Examiner* — Diane L Lo
(74) *Attorney, Agent, or Firm* — Myers Wolin, LLC

(57) ABSTRACT

A wireless communications system configured to use a predetermined bandwidth of an unlicensed bandwidth, the wireless communications system including: a base station configured to transmit a control signal that includes information indicating an offset time from a reference timing; and a terminal connected to the base station and configured to: receive the control signal from the base station; perform a process of detecting a wireless signal of the predetermined bandwidth in a standard period; and start transmission from a transmission start timing according to the offset time after no wireless signal of the predetermined bandwidth is detected in the process, the transmission start timing being a timing at which the terminal is allowed to start transmission of wireless signals.

10 Claims, 17 Drawing Sheets

Related U.S. Application Data continuation of application No. PCT/JP2014/079511, filed on Nov. 6, 2014.

(51) Int. Cl.
| | | |
|---|---|---|
| *H04W 16/28* | (2009.01) | |
| *H04W 16/14* | (2009.01) | |
| *H04W 74/00* | (2009.01) | |

(52) U.S. Cl.
CPC ... *H04W 56/0005* (2013.01); *H04W 56/0045* (2013.01); *H04W 74/006* (2013.01); *H04W 74/008* (2013.01); *H04W 74/0808* (2013.01)

(56) References Cited

U.S. PATENT DOCUMENTS

| | | | |
|---|---|---|---|
| 2007/0259693 | A1 | 11/2007 | Brunel et al. |
| 2008/0273610 | A1 | 11/2008 | Malladi et al. |
| 2009/0086706 | A1 | 4/2009 | Huang et al. |
| 2010/0124215 | A1 | 5/2010 | Kogawa et al. |
| 2011/0116407 | A1 | 5/2011 | Ren et al. |
| 2011/0243111 | A1 | 10/2011 | Andgart et al. |
| 2012/0155295 | A1* | 6/2012 | Trainin .............. H04W 74/0808 370/252 |
| 2012/0224540 | A1 | 9/2012 | Kwon et al. |
| 2014/0036853 | A1 | 2/2014 | Kim et al. |
| 2014/0044105 | A1 | 2/2014 | Bontu et al. |
| 2014/0112289 | A1* | 4/2014 | Kim ..................... H04L 5/0078 370/329 |
| 2014/0287769 | A1 | 9/2014 | Taori et al. |

FOREIGN PATENT DOCUMENTS

| | | |
|---|---|---|
| JP | 2007-312380 A | 11/2007 |
| JP | 2010-103665 A | 5/2010 |
| JP | 2010-119058 A | 5/2010 |
| JP | 2010-178233 A | 8/2010 |
| JP | 2011-517860 A | 6/2011 |
| JP | 2011-526745 A | 10/2011 |
| JP | 2012-049642 A | 3/2012 |
| JP | 2012-257258 A | 12/2012 |
| JP | 2013-524598 A | 6/2013 |
| JP | 2013-201629 A | 10/2013 |
| JP | 2014-500685 A | 1/2014 |
| JP | 2014-511629 A | 5/2014 |
| RU | 2 450 471 C2 | 5/2012 |
| WO | 2012/078565 A1 | 6/2012 |

OTHER PUBLICATIONS

Ericsson et al., "Study on Licensed-Assisted Access using LTE" RP-141646, 3GPP TSG RAN Meeting #65, Edinburgh, Scotland, Sep. 9-12, 2014.
Verizon et al., "Use Cases & Scenarios for Licensed Assisted Access" RWS-140020 3GPP TSG RAN Workshop on LTE in Unlicensed Spectrum, Sophia Antipolis, France, Jun. 13, 2013.
3GPP TS 36.211 V12.3.0, 3rd Generation Partnership Project; Technical Specification Group Radio Access Network; Evolved Universal Terrestrial Radio Access (E-UTRA); Physical channels and modulation (Release 12), Sep. 2014.
Huang et al.,"Cross-Layer Multi-Packet Reception Based Medium Access Control and Resource Allocation for Space-Time Coded MIMO/OFDM" Wireless Communications, IEEE Transactions on, Sep. 19, 2008, vol. 7, Issue 9, paragraph 2, Cited in ISR for PCT/JP2014/079511.
Tandai et al.,"An efficient uplink multiuser MIMO protocol in IEEE 802.11 WLANs" Personal, Indoor and Mobile Radio Communications 2009 IEEE 20th International Symposium on, Sep. 16, 2009, paragraph 2, Cited in ISR for PCT/JP2014/079511.
International Search Report issued for corresponding International Patent Application No. PCT/PCT/JP2014/079511 dated Jan. 13, 2015, with an English translation.
International Preliminary Report on Patentability for corresponding International Patent Application No. PCT/PCT/JP2014/079511 dated Jan. 13, 2015, with partial English translation.
Office Action issued by the Canadian Intellectual Property Office for corresponding Canadian Patent Application No. 2,965,897, dated Apr. 5, 2018.
IEEE Standard for Information technology—, "Telecommunications and information exchange between systems—Local and metropolitan area networks—Specific requirements, Part 11: Wireless LAN Medium Access Control (MAC) and Physical Layer (PHY) Specifications", published Jun. 12, 2007.
Notice of Preliminary Rejection issued by the Korean Intellectual Property Office for corresponding Korean Patent Application No. 10-2017-7010866, dated Aug. 30, 2018, with English translation.
Huawei et al., "Potential solutions for LAA-LTE design", Agenda Item: 7.3.2.3, 3GPP TSG-RAN WG1 Meeting #78bis, R1-143726, Ljubljana, Slovenia, Oct. 6-10, 2014.
Coolpad, "Discussion on the regulatory requirements of LAA", Agenda Item: 7.3.2.1, 3GPP TSG-RAN WG1 Meeting #78bis, R1-144128, Ljubljana, Slovenia, Oct. 6-10, 2014.
LG Electronics, "Candidate solutions for LAA operation", Agenda Item: 7.3.2.3, 3GPP TSG-RAN WG1 Meeting #78bis, R1-144042, Ljubljana, Slovenia, Oct. 6-10, 2014.
Interdigital Communications, "On design targets and supported functionality for LTE LAA", Agenda Item: 7.3.2.2, 3GPP TSG-RAN WG1 Meeting #78bis, R1-144219, Ljubljana, Slovenia, Oct. 6-10, 2014.
Notification of Reasons for Refusal issued by the Japan Patent Office for corresponding Japanese Patent Application No. 2018-132656, dated Mar. 12, 2019, with an English translation.
Notice of Reasons of Refusal issued by the Japanese Patent Office for corresponding Japanese Patent Application No. 2018-132656 dated Jun. 25, 2019 with an English translation.
Notification of Reasons for Refusal issued by the Japan Patent Office for corresponding Japanese Patent Application No. 2016-557410, dated Feb. 20, 2018, with an English translation.
First Notification of Office Action issued for corresponding Chinese Patent Application No. 201480083199.7 dated Aug. 5, 2019, with a partial English translation.
Decision of Refusal issued for corresponding Japanese Patent Application 2018-132656, dated Sep. 17, 2019; Full English machine translation attached.
Non-Final Office Action issued for corresponding U.S. Appl. No. 15/485,641, issued by the USPTO dated May 16, 2018.
Final Office Action issued for corresponding U.S. Appl. No. 15/485,641, issued by the USPTO dated Sep. 18, 2018.
Non-Final Office Action issued for corresponding U.S. Appl. No. 15/485,641, issued by the USPTO dated Jan. 31, 2019.
Notice of Allowance issued for corresponding U.S. Appl. No. 15/485,641, issued by the USPTO dated Jul. 8, 2019.
Office Action issued by Rospatent Federal Service for Intellectual Property for corresponding Russian Patent Application No. 2017114702/07(025643), dated Dec. 18, 2017, with partial English translation.
Search Report issued by Rospatent Federal Service for Intellectual Property for corresponding Russian Patent Application No. 2017114702/07(025643), dated Dec. 18, 2017, with partial English translation.
Extended European search report with supplementary European search report and the European search opinion issued by the European Patent Office for corresponding European Patent Application No. 14905564.2, dated Oct. 16, 2017.
Ratasuk et al., "License-Exempt LTE Deployment in Heterogeneous Network", 2012 International Symposium on Wireless Communication Systems (ISWCS), IEEE, pp. 246-250, Aug. 28, 2012.

* cited by examiner

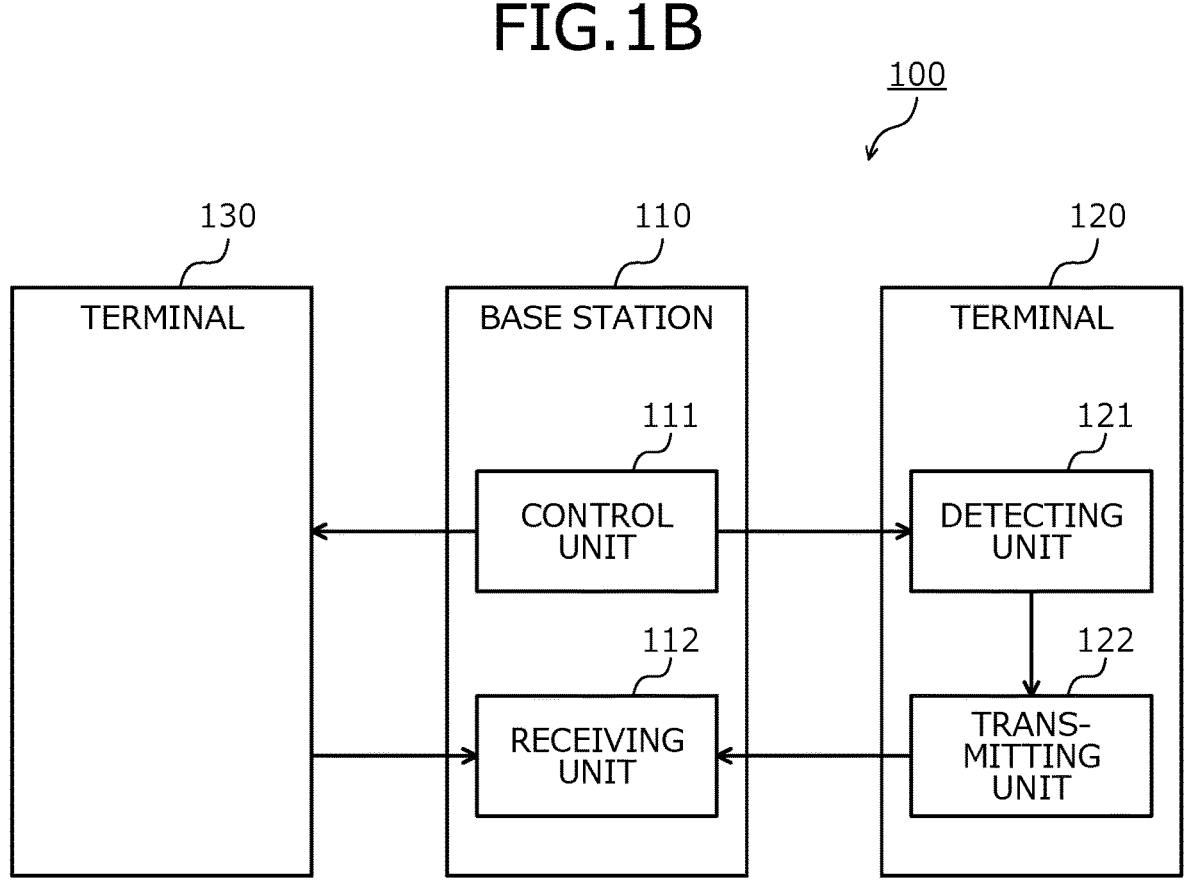

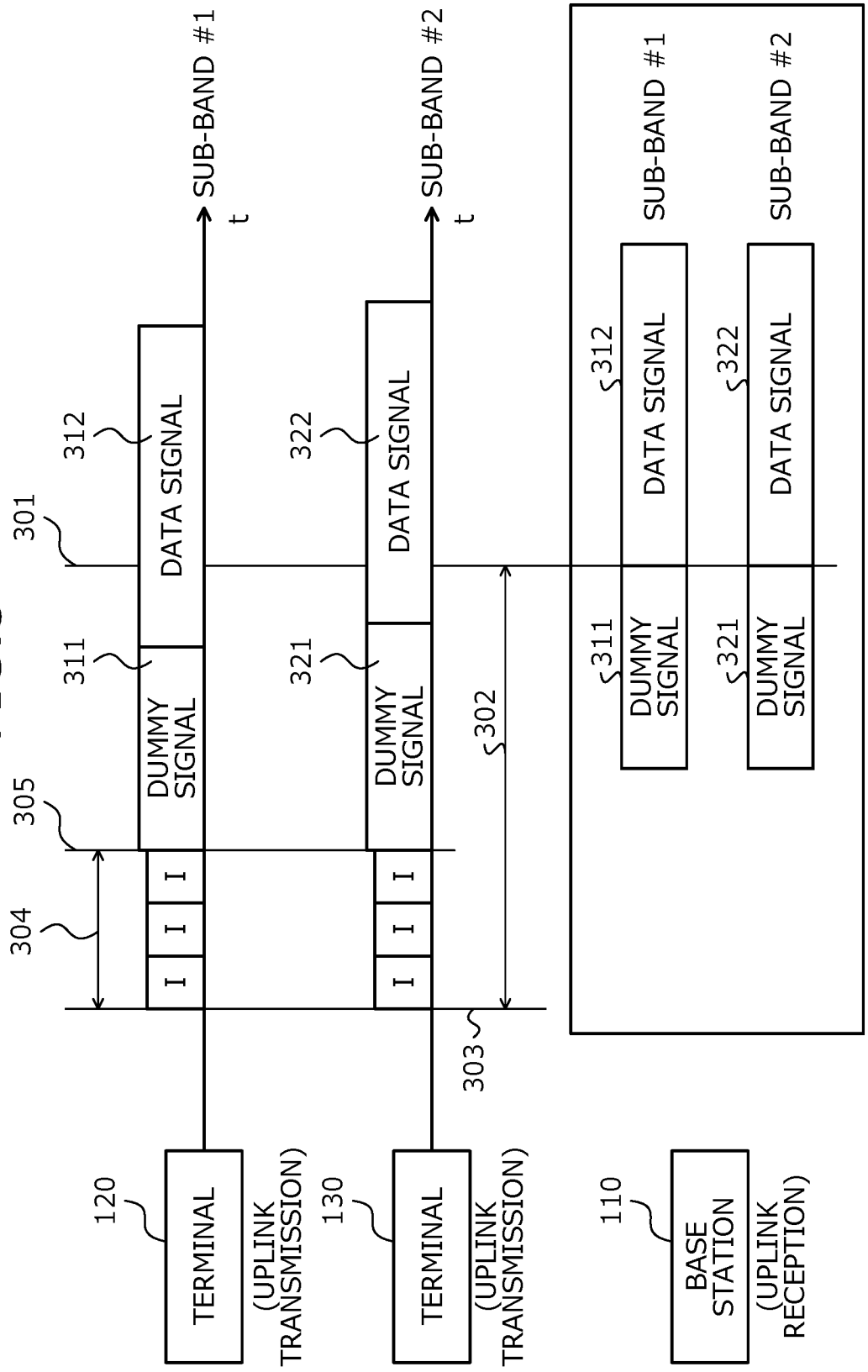

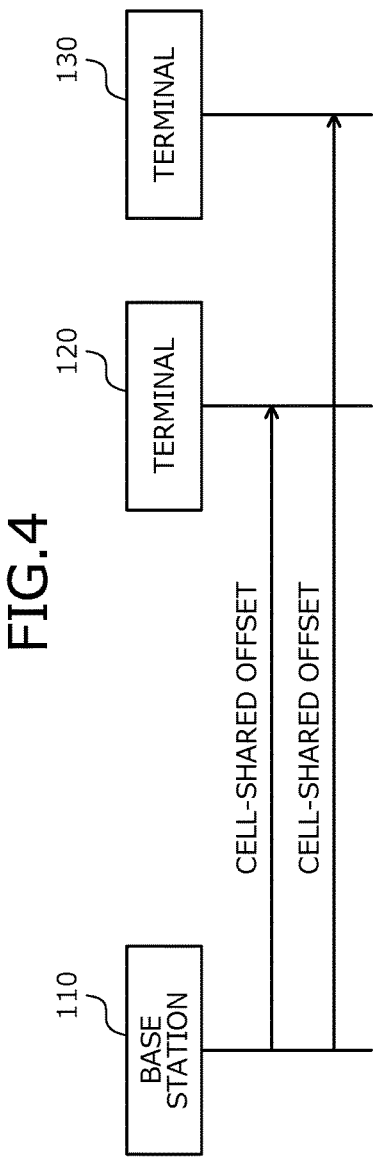

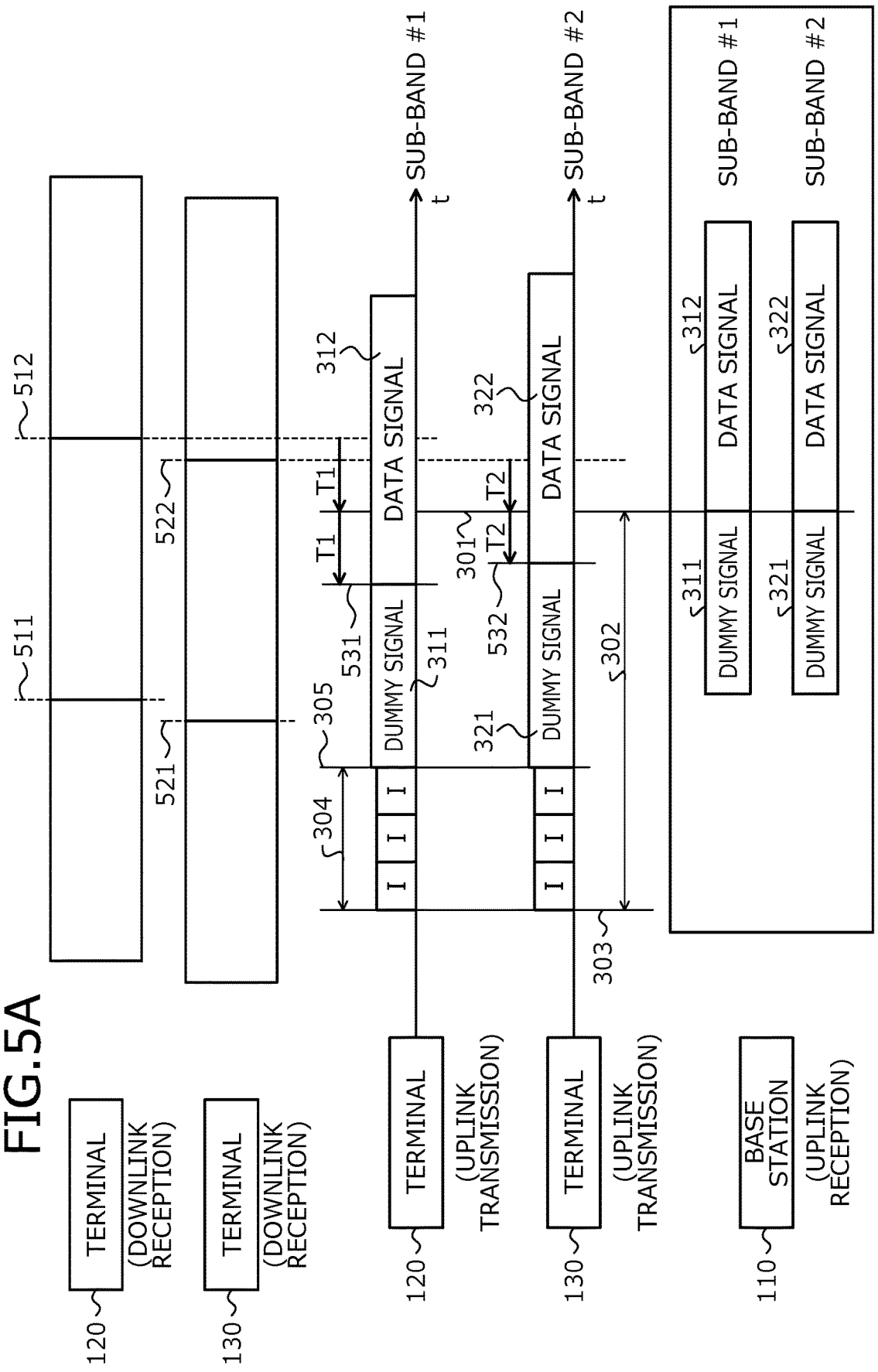

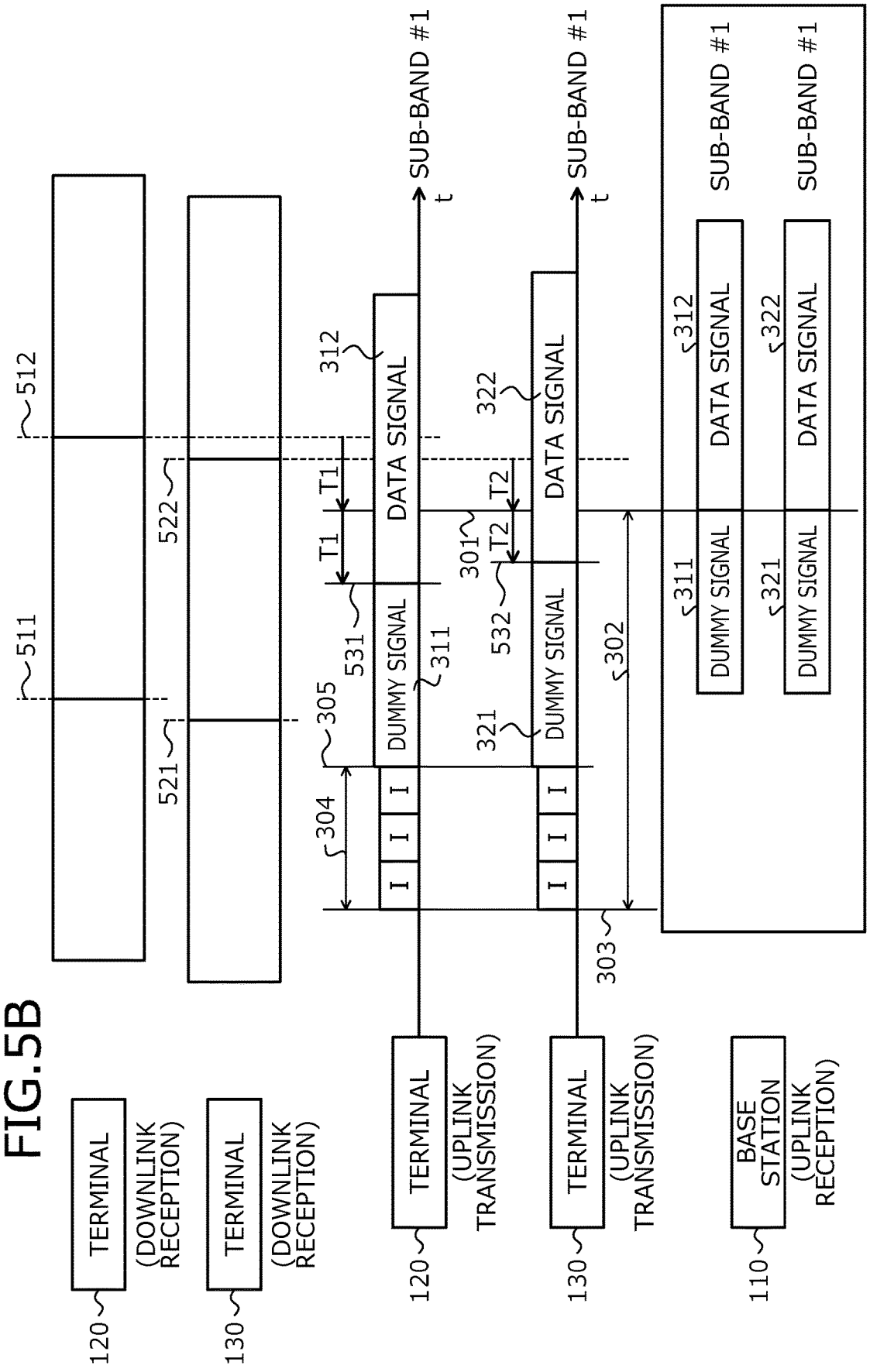

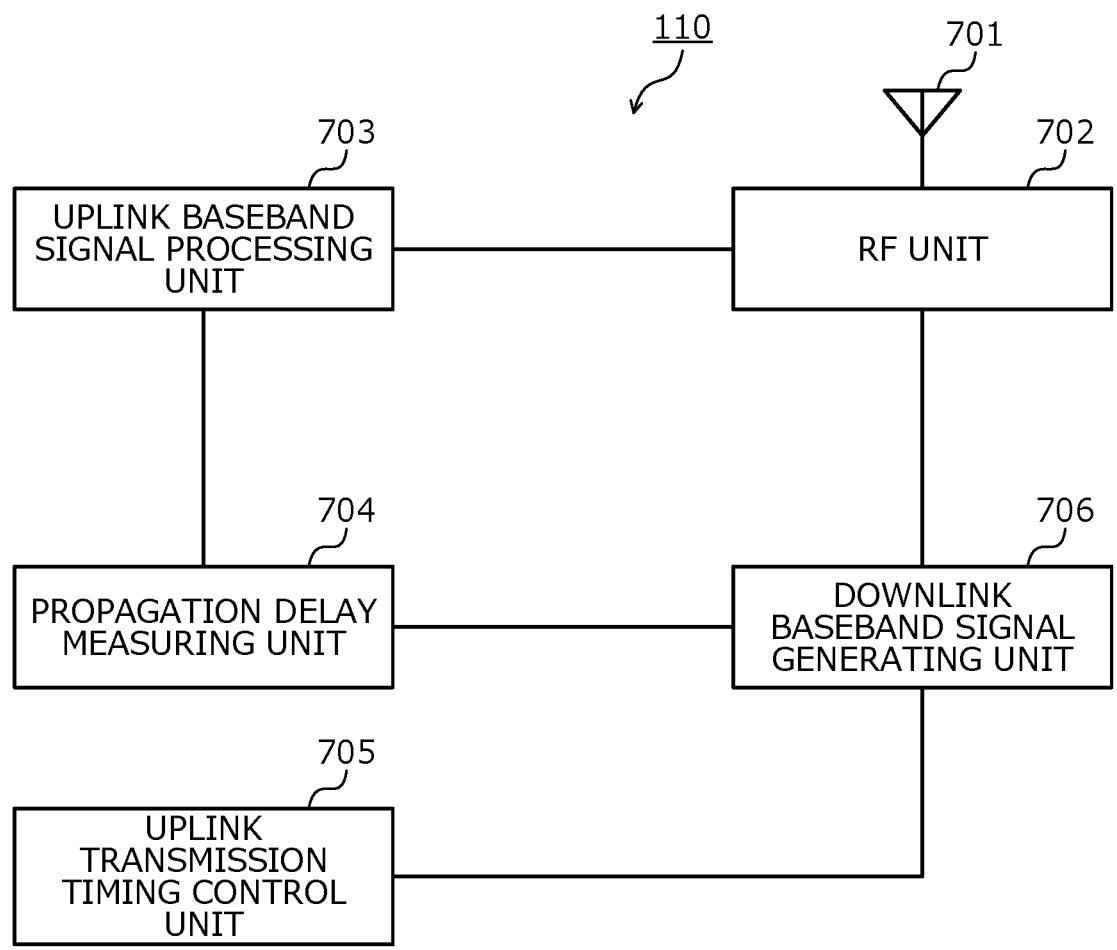

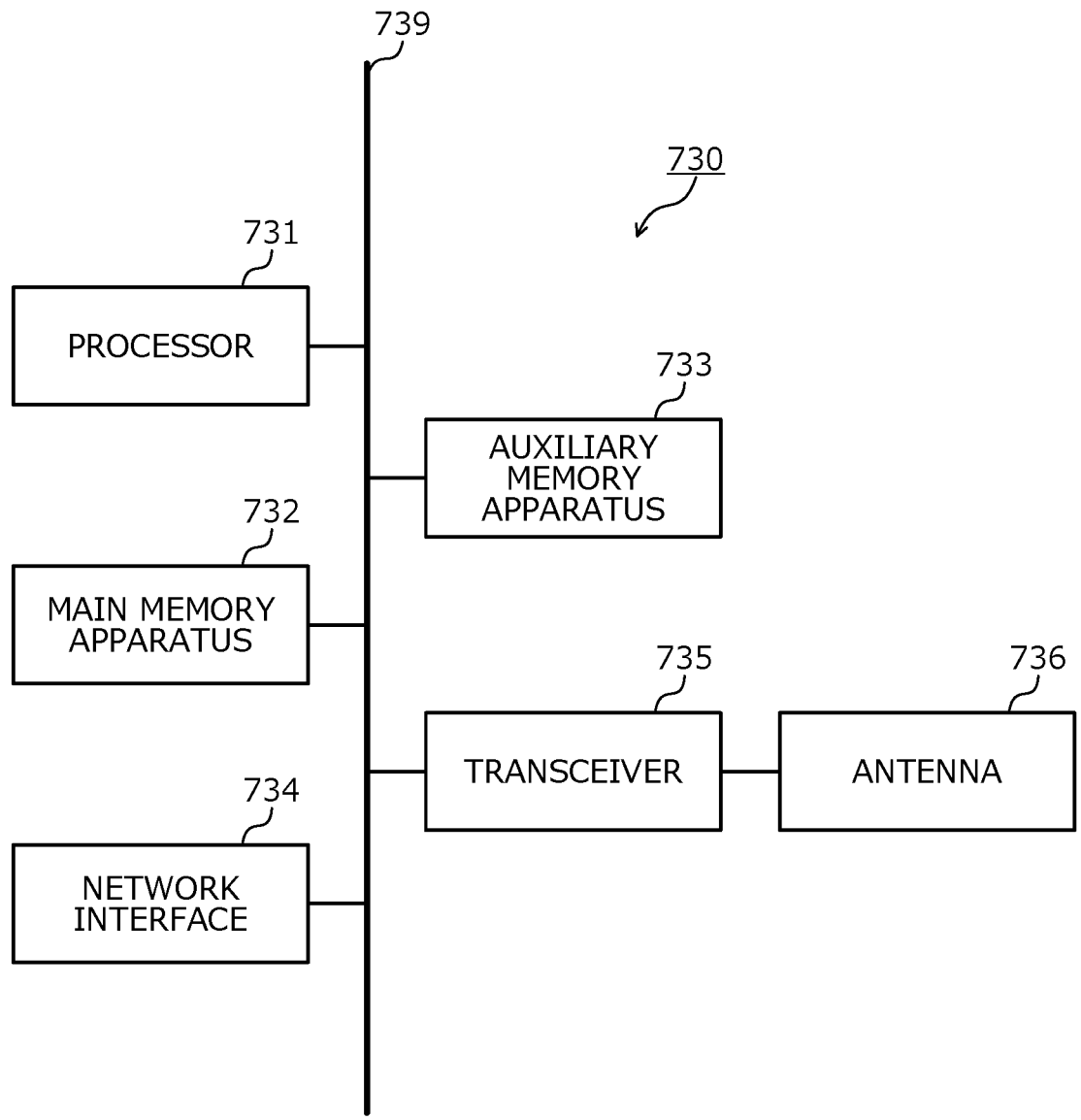

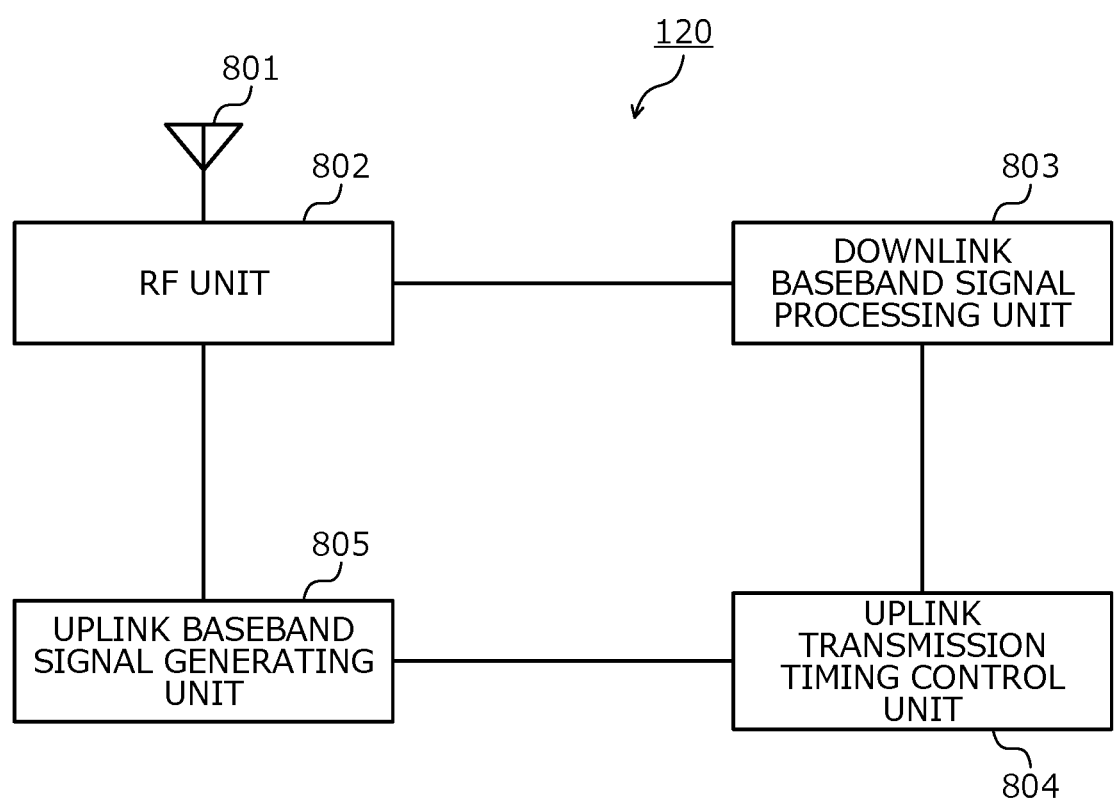

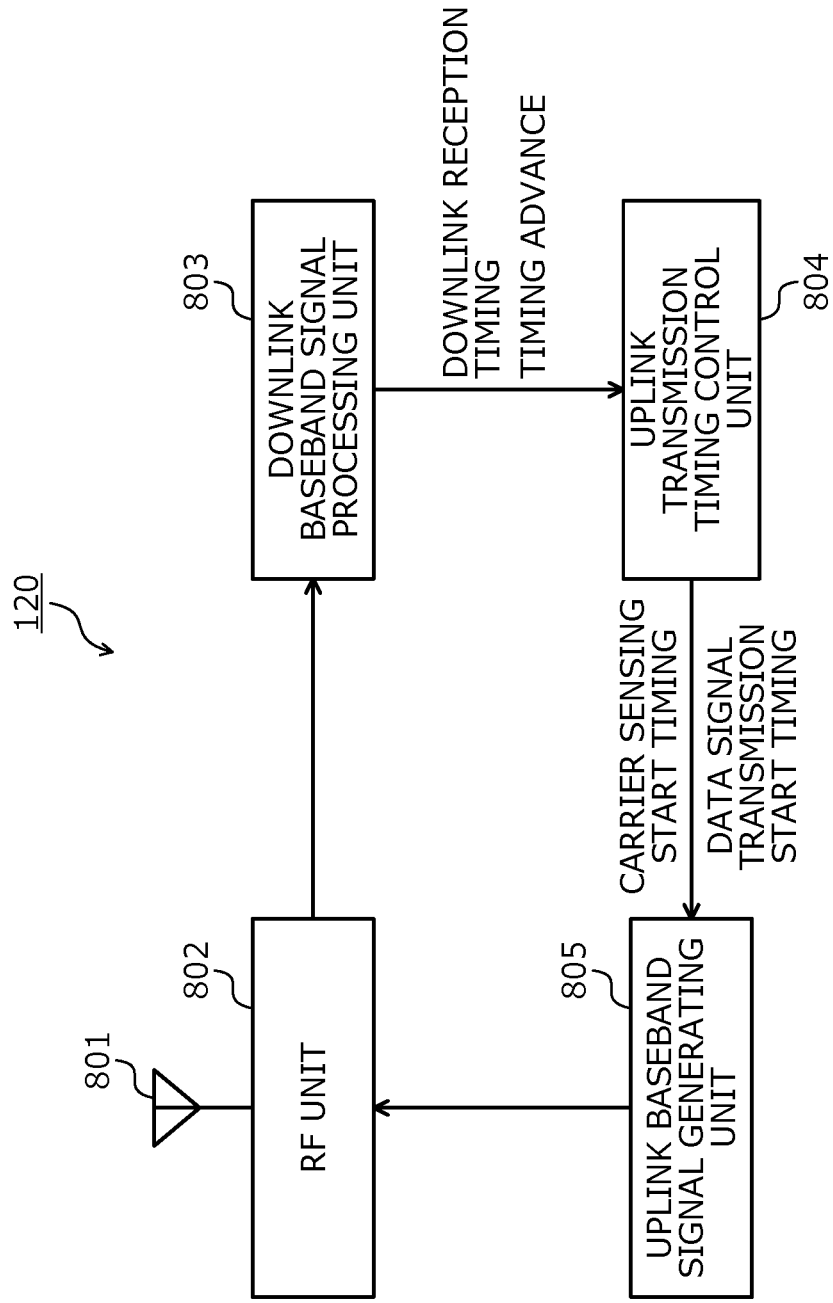

WIRELESS COMMUNICATIONS SYSTEM, BASE STATION, TERMINAL, AND PROCESSING METHOD

CROSS REFERENCE TO RELATED APPLICATIONS

This application is a continuation application of U.S. application Ser. No. 15/485,641 which was filed on Apr. 12, 2017, and is a continuation application of International Application PCT/JP2014/079511, filed on Nov. 6, 2014, and designating the U.S., the entire contents of each are incorporated herein by reference.

FIELD

The embodiments discussed herein relate to a wireless communications system, a base station, a terminal, and a processing method.

BACKGROUND

Long Term Evolution (LTE) mobile communication, LTE-advanced mobile communication and the like are conventionally known. A technique of performing carrier aggregation (CA) using unlicensed spectrum is further known (for example, refer to Published Japanese-Translation of PCT Application, Publication No. 2014-500685)

SUMMARY

According to an aspect of an embodiment, a wireless communications system configured to use a predetermined bandwidth of a Unlicensed bandwidth, includes a base station; and one or more terminals connected to the base station. The one or more terminals calculate a transmission start timing according to a control signal from the base station, perform a process of detecting a wireless signal of the predetermined bandwidth before the transmission start timing, and when a state in which no wireless signal of the predetermined bandwidth is detected has elapsed for a predetermined period, the one or more terminals start transmission from the calculated transmission start timing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1B is a diagram depicting an example of signal flow in the wireless communications system depicted in FIG. 1A;

FIG. 3 is a diagram depicting an example of a timing of signal transmission and reception, and carrier sensing;

FIG. 4 is a diagram depicting an example of notification of a cell-shared offset by a base station;

FIG. 5A is a diagram depicting an example of a transmission start timing of terminals;

FIG. 5B is a diagram depicting a modification example of the transmission start timing of the terminals;

FIG. 7A is a diagram depicting an example of the base station according to the embodiment;

FIG. 7C is a diagram depicting an example of hardware configuration of the base station;

FIG. 8A is a diagram depicting an example of the terminal according to the embodiment;

FIG. 10 is a diagram depicting an example of signal flow in the terminal according to the modification example.

DESCRIPTION OF THE INVENTION

An embodiment of a wireless communications system, a base station, a terminal, and a processing method according to the present invention will be described in detail with reference to the accompanying drawings.

Figure 1A:
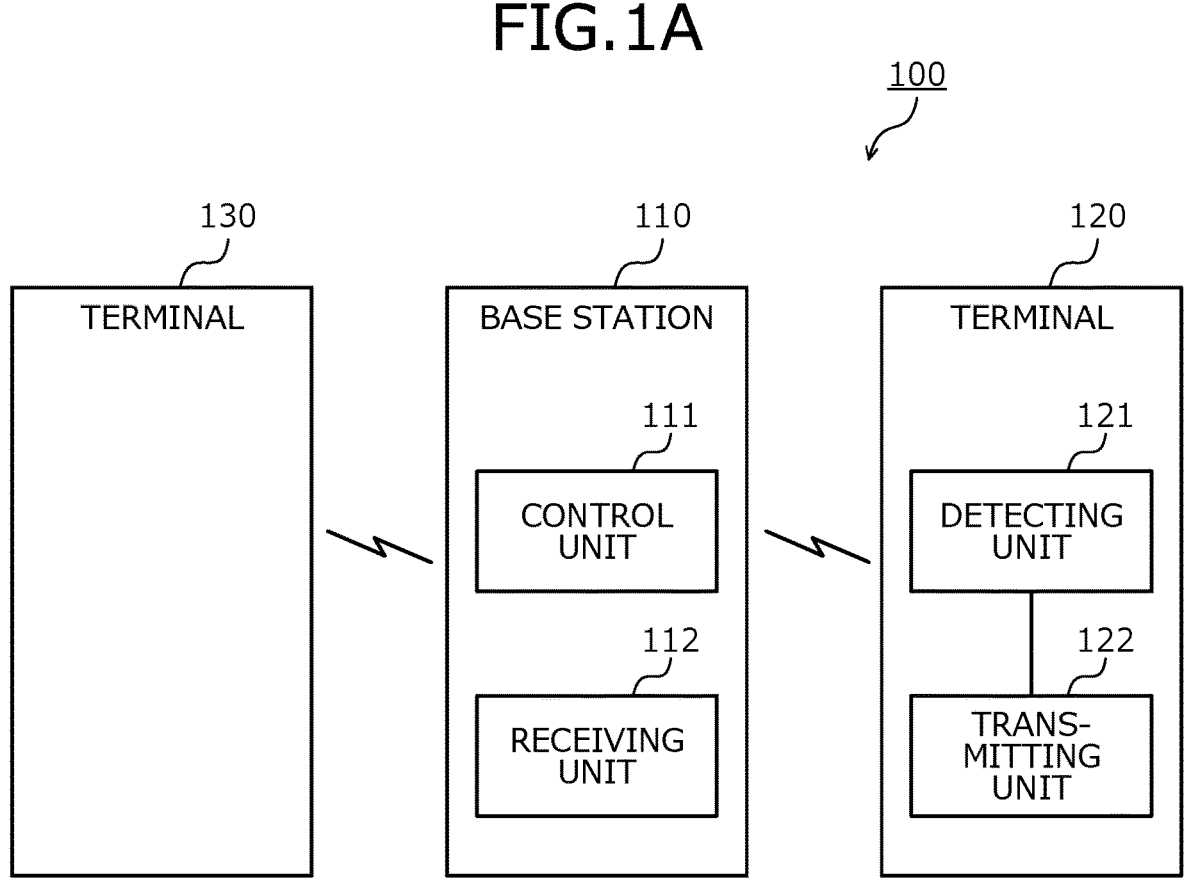
FIG. 1A is a diagram depicting an example of a wireless communications system according to an embodiment.

FIG. 1A is a diagram depicting an example of the wireless communications system according to the embodiment. FIG. 1B is a diagram depicting an example of signal flow in the wireless communications system depicted in FIG. 1A. As depicted in FIGS. 1A and 1B, a wireless communications system 100 according to the embodiment includes a base station 110 and terminals 120, 130.

The wireless communications system 100 is a system that shares a predetermined bandwidth with other wireless communications systems. The predetermined bandwidth is a bandwidth shared by multiple wireless communications systems including the wireless communications system 100. An example of the predetermined bandwidth is an unlicensed bandwidth (non-licensed bandwidth). An example of an unlicensed bandwidth is an Industry-Science-Medical (ISM) bandwidth (2.4 [GHz] bandwidth), a 5 [GHz] bandwidth, etc. used in a wireless local area network (WLAN), or the like.

The base station 110 uses the predetermined bandwidth shared with other wireless communications systems to wirelessly communicate with the terminals 120, 130 connected to the base station 110 (connected thereto). Further, the base station 110, for example, may wirelessly communicate with the terminals 120, 130 by carrier aggregation, via a bandwidth used exclusively by the wireless communications system 100 (the system thereof) and the predetermined bandwidth shared with other wireless communications systems.

In the wireless communications system 100, for example, uplink user multiplexing is performed where the terminals 120, 130 concurrently transmit wireless signals to the base station 110 by the predetermined bandwidth. At this time, the terminals 120, 130 transmit the wireless signals to the base station 110 by differing bandwidths among bandwidths included in the predetermined bandwidth. Further, for example, when Multi User Multiple Input Multiple Output (multiuser MIMO) is used, the terminals 120, 130 transmit the wireless signals to the base station 110 by the same bandwidth.

The base station 110 includes a control unit 111 and a receiving unit 112. The control unit 111 transmits to the terminals 120, 130, a parameter for calculating a predetermined timing common between the terminals 120, 130. The receiving unit 112 receives wireless signals transmitted by the terminals 120, 130. For example, the receiving unit 112 receives data signals that are addressed to the base station 110 and included in the wireless signals transmitted by the terminals 120, 130.

The terminal 120 includes a detecting unit 121 and a transmitting unit 122. Here, although configuration of the terminal 120 is described, the configuration of the terminal 130 is identical to that of the terminal 120. The detecting unit 121 starts, at the predetermined timing common between the terminals 120, 130, a process of detecting a wireless signal of the predetermined bandwidth. As a result, the timing at which the terminals 120, 130 start the process of detecting a wireless signal of the predetermined bandwidth may be made to coincide. The predetermined timing, for example, may be calculated based on the parameter transmitted to the terminals 120, 130 by the base station 110. The detecting unit 121 notifies the transmitting unit 122 of the detection result.

Based on the detection result from the detecting unit 121, the transmitting unit 122, at a timing when a state in which no wireless signal of the predetermined bandwidth is detected has continued for a predetermined period, starts transmitting a wireless signal of a bandwidth corresponding to the terminal 120, among the bandwidths included in the predetermined bandwidth. The predetermined period is a period shared between the terminals 120, 130. As a result, the timing at which the terminals 120, 130 transmit a wireless signal may be made to coincide.

According to the configuration depicted in FIGS. 1A and 1B, the predetermined timing at which the terminals 120, 130 start detection for available bandwidth that is shared with other wireless communications systems, and the predetermined period until a wireless signal is transmitted by the terminals 120, 130 may be made to coincide. As a result, the timing of wireless signal transmission at the terminals 120, 130 may be made to coincide and transmission collisions between the terminals 120, 130 in the shared bandwidth may be avoided. Thus, uplink frequency-division user multiplexing in the shared bandwidth or spatial-division user multiplexing by multiuser MIMO becomes possible, enabling throughput to be improved.

Wireless signal detection in the predetermined bandwidth by the detecting unit 121 is, for example, Clear Channel Assessment (CCA) of detecting carrier availability in the predetermined bandwidth, for example, carrier sensing.

For example, wireless signal detection in the predetermined bandwidth is a process of detecting the reception power (reception energy) of a radio wave in the predetermined bandwidth and comparing the detected reception power and a predetermined power to detect a wireless signal. Alternatively, wireless signal detection in the predetermined bandwidth may be a process of detecting wireless signals by detecting a predetermined pattern (e.g., preamble) of a wireless signal, based on a radio wave in the predetermined bandwidth.

Further, the process of detecting a wireless signal of the predetermined bandwidth is, for example, a process of detecting a wireless signal in the entire predetermined bandwidth. Alternatively, the process of detecting a wireless signal of the predetermined bandwidth may be process of detecting a wireless signal in only the bandwidth in which the terminal transmits wireless signals, among those of the predetermined bandwidth.

Although a configuration in which the terminals 120, 130 calculate the predetermined timing based on a parameter transmitted from the base station 110 is explained, the base station 110 does not have to transmit the parameter. In this case, the terminals 120, 130, for example, may calculate the predetermined timing based on information shared between the terminals 120, 130. Further, in this case, the base station 110 may omit the control unit 111.

The information shared between the terminals 120, 130, for example, may be information that includes cell identification information (e.g., cell ID) of the base station 110. Further, the information shared by the terminals 120, 130 may be information that includes identification information (e.g., subframe number) of a subframe for performing the process of detecting a wireless signal.

Figure 2:
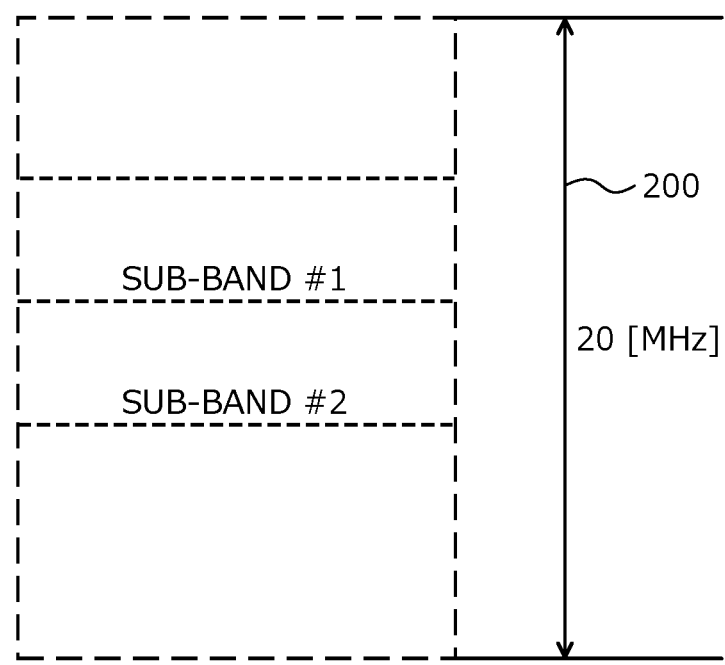
FIG. 2 is a diagram depicting an example of a bandwidth of an unlicensed bandwidth.

FIG. 2 is a diagram depicting an example of a bandwidth of the unlicensed bandwidth. In the wireless communications system 100, for example, an unlicensed bandwidth 200 is used. In the example depicted in FIG. 2, the unlicensed bandwidth 200 is a bandwidth of 20 [MHz].

The unlicensed bandwidth 200 is a bandwidth shared between the wireless communications system 100 and other systems. Other systems are, for example, WLAN wireless communications systems, LTE or LTE-A wireless communications systems different from the wireless communications system 100, etc.

The unlicensed bandwidth 200 includes sub-bands #1, #2. Here, description will be given concerning a case where the base station 110 has assigned the sub-band #1 to uplink transmission of the terminal 120 and the sub-band #2 to uplink transmission of the terminal 130.

FIG. 3 is a diagram depicting an example of the timing of signal transmission and reception, and carrier sensing. In FIG. 3, a horizontal axis (t) represents time.

A reference timing 301 is a common reference timing in a cell of the base station 110. In the example depicted in FIG. 3, the reference timing 301 is a timing at which the base station 110 transmits and receives signals by the sub-bands #1, #2. However, the reference timing 301 may be a timing different from the timing at which the base station 110 transmits and receives signals by the sub-bands #1, #2.

A cell-shared offset 302 is a common offset in a cell of the base station 110 and is a parameter for calculating the reference timing 301 (predetermined timing). In the example depicted in FIG. 3, the cell-shared offset 302 is an offset between the reference timing 301 and a carrier sensing start timing 303.

The carrier sensing start timing 303 is a timing at which the terminals 120, 130 start carrier sensing. Further, the carrier sensing start timing 303 is a timing uniquely determined from the reference timing 301 and the cell-shared offset 302.

In the example depicted in FIG. 3, the carrier sensing start timing 303 is a timing preceding the reference timing 301 by the cell-shared offset 302. However, the carrier sensing start timing 303, for example, may be a timing after the reference timing 301 by the cell-shared offset 302.

A specified idle period 304 is a standard period for determining bandwidth availability. For example, when the terminals 120, 130 perform carrier sensing and an idle state (I) has continued during the specified idle period 304, it is determined that bandwidth is available.

A planned transmission-start-timing 305 is a timing at which the terminals 120, 130 are to start transmitting wireless signals, when determining, by carrier sensing, that bandwidth is available. For example, the planned transmission-start-timing 305 is a timing after the carrier sensing start timing 303 by the specified idle period 304.

In the example depicted in FIG. 3, the terminal 120 starts carrier sensing at the carrier sensing start timing 303 and since an idle state (I) has continued for the specified idle period 304, the terminal 120 starts transmitting a wireless signal at the planned transmission-start-timing 305. At this time, the terminal 120 first transmits a dummy signal 311 and thereafter, transmits a data signal 312.

Similarly, the terminal 130 also starts carrier sensing at the carrier sensing start timing 303 and since an idle state (I) has continued for the specified idle period 304, the terminal 130 starts transmitting a wireless signal at the planned transmission-start-timing 305. At this time, the terminal 130 first transmits a dummy signal 321 and thereafter, transmits a data signal 322.

As a result, a reception timing of the data signals 312, 322 at the base station 110 may be made to coincide with the reference timing 301. Further, from the planned transmission-start-timing 305 until the start of transmission of the data signals 312, 322, transmission of a wireless signal (interruption) by another communications apparatus may be prevented. Another communications apparatus is, for example, a communications apparatus of a wireless communications system different from the wireless communications system 100.

In the example depicted in FIG. 3, although a case has been described in which the terminals 120, 130 transmit the dummy signals 311, 321, respectively, the terminals 120, 130 may transmit a preamble in place of the dummy signals 311, 321. The preambles transmitted by the terminals 120, 130 are wireless signals of a predetermined pattern and, for example, are preambles of the data signals 312, 322.

Further, in the example depicted in FIG. 3, a case has been described in which the cell-shared offset 302 is an offset between the reference timing 301 and the carrier sensing start timing 303. However, without limitation hereto, the cell-shared offset 302, for example, may be an offset between the reference timing 301 and the planned transmission-start-timing 305.

In this case, the terminals 120, 130 calculate, as the planned transmission-start-timing 305, a timing that precedes the reference timing 301 by the cell-shared offset 302. The terminals 120, 130 calculate, as the carrier sensing start timing 303, a timing that precedes the calculated planned transmission-start-timing 305 by the specified idle period 304, and start carrier sensing.

Further, the cell-shared offset 302, for example, may be of a length that differs for each predetermined interval (e.g., for each subframe, for every several subframes, etc.). As a result, for example, an occurrence of continuous collisions consequent to the terminals 120, 130 transmitting wireless signals at the same timing as a communications apparatus of a neighbor cell may be avoided.

Further, the cell-shared offset 302 may be an offset determined based on a value unique to a cell of the base station 110 (e.g., cell number). As a result, collisions with a communications apparatus of a neighbor cell may be suppressed.

For example, the base station 110 may determine the cell-shared offset 302 based on at least one of the subframe number and the cell number. For instance, the base station 110 determines the cell-shared offset 302 based on equation (1).

$$\text{offset} = u + ((\Sigma_{i=0}^{7} c(8v+i) \cdot 2^i) \bmod L + w) \bmod L \quad (1)$$

c(i): pseudorandom number sequence

In equation (1), offset is the cell-shared offset 302 that is to be determined; c(i) is a pseudorandom number sequence; and u, v, w, and L are constants predefined in the wireless communications system 100. For c(i), for example, the Gold sequence specified in TS36.211 of the 3GPP may be used. For example, for c(i), equation (2) may be used.

$$c(n) = (x_1(n+N_C) + x_2(n+N_C)) \bmod 2$$

$$x(n+31) = (x_1(n+3) + x_1(n)) \bmod 2$$

$$k(n+31) = (x_2(n+3) + x_2(n+2) + x_2(n+1) + x_2(n)) \bmod 2 \quad (2)$$

(where, $N_C = 1600$)

In equation (2), $x_1(n)$, $x_2(n)$ are each a sequence called an m-sequence, and the initial value is obtained by equation (3).

$$x_1(0) = 1, x_1(n) = 0, n = 1, 2, \ldots, 30$$

$$c_{init} = \Sigma_{i=0}^{30} x_2(i) \cdot 2^i \quad (3)$$

For example, the base station 110 may substitute a subframe number for at least one of v, w, and $c_{init}$ and thereby, determine the cell-shared offset 302 that is based on the subframe number. Alternatively, the base station 110 may substitute a cell number for at least one of v, w, and $c_{init}$ and thereby, determine the cell-shared offset 302 that is based on the cell number.

Alternatively, the base station 110 may substitute a subframe number and a cell number for at least one of v, w, $c_{init}$ and thereby, determine the cell-shared offset 302 that is based on the subframe number and the cell number. For example, in equations (1) to (3), the base station 110 substitutes a subframe number for v and substitutes a cell number for $c_{init}$, and is able to determine w=0, L=64, u=12 as the cell-shared offset 302.

Further, the cell-shared offset 302 may be an offset that is determined based on a random number. As a result, for example, the occurrence of continuous collisions consequent to the terminals 120, 130 transmitting wireless signals at the same timing as a communications apparatus of a neighbor cell may be avoided. For example, the base station 110 may determine the cell-shared offset 302 by equation (4).

$$\text{cell-shared offset} = a \times \text{unit time} \quad (4)$$

In equation (4), "a" is a random number randomly selected from {0, 1, . . . A}. "A" is a value less than the subframe length in the wireless communications system 100.

FIG. 4 is a diagram depicting an example of notification of the cell-shared offset by the base station. As depicted in FIG. 4, for example, the base station 110 notifies the terminals 120, 130 connected to a cell thereof of the cell-shared offset. For example, a common downlink control channel such as a Physical Downlink Control Channel (PDCCH) or the like may be used for the notification of the cell-shared offset.

Further, for example, upper layer control information such as radio resource control (RRC) or the like may be used for the notification of the cell-shared offset. Further, for example, a broadcast channel such as a Physical Broadcast Channel (PBCH) may be used for the notification of the cell-shared offset.

Further, the base station 110 may notify the terminals 120, 130 of a parameter that enables calculation of the cell-shared offset at the terminals 120, 130 and may thereby indirectly notify the terminals 120, 130 of the cell-shared offset. In this case, the terminals 120, 130 calculate the cell-shared offset based on the parameter notified by the base station 110.

FIG. 5A is a diagram depicting an example of a transmission start timing of terminals. In FIG. 5A, portions identical to those depicted in FIG. 3 are given the same reference numerals used in FIG. 3 and description thereof is omitted hereinafter. Subframe borders 511, 512 are borders of subframes in downlink reception from the base station 110 to the terminal 120. Subframe borders 521, 522 are borders of subframes in downlink reception from the base station 110 to the terminal 130.

For example, the base station 110 transmits downlink signals to the terminals 120, 130 at the same timing (the reference timing 301). On the contrary, consequent to a difference in a propagation delay T1 between the base station 110 and the terminal 120, and a propagation delay T2 between the base station 110 and the terminal 130, the subframe borders 511, 512 and the subframe borders 521, 522 have different timings.

For example, the subframe border 512 is a timing after the reference timing 301 by the propagation delay T1. A data-signal transmission start timing 531 is a timing at which the terminal 120 starts transmitting the data signal 312 and is a timing preceding the reference timing 301 by the propagation delay T1.

The terminal 120 is capable of identifying, as the data-signal transmission start timing 531, a timing preceding the subframe border 512 by the propagation delay T1×2. The terminal 120 starts transmitting the data signal 312 at the data-signal transmission start timing 531 whereby the reception timing of the data signal 312 at the base station 110 may be made to coincide with the reference timing 301.

Further, the subframe border 522 is a timing after the reference timing 301 by the propagation delay T2. A data-signal transmission start timing 532 is a timing at which the terminal 130 starts transmitting the data signal 322 and is a timing preceding the reference timing 301 by the propagation delay T2. The terminal 130 is capable of identifying, as the data-signal transmission start timing 532, a timing preceding the subframe border 522 by the propagation delay T2×2. The terminal 130 starts transmitting the data signal 322 at the data-signal transmission start timing 532 whereby the reception timing of the data signal 322 at the base station 110 may be made to coincide with the reference timing 301.

Further, the terminal 120 is able to identify the propagation delay T1×2 based on a timing advance (TA) received from the base station 110. For example, the base station 110 measures the propagation delay T1 between the base station 110 and the terminal 120, and transmits to the terminal 120, a timing advance indicating a value that is two times the measured propagation delay T1. With this, the terminal 120 is able to identify, as the propagation delay T1×2, the value of the timing advance received from the base station 110.

Further, the terminal 130 is able to identify the propagation delay T2×2 based on the timing advance received from the base station 110. For example, the base station 110 measures the propagation delay T2 between the base station 110 and the terminal 130, and transmits to the terminal 130, a timing advance indicating a value that is two times the measured propagation delay T2. With this, the terminal 130 is able to identify as the propagation delay T2×2, the value of the timing advance received from the base station 110.

Further, the interval during which the terminal 120 transmits the dummy signal 311, for example, may be an interval from the planned transmission-start-timing 305 until the data-signal transmission start timing 531. Further, the interval during which the terminal 130 transmits the dummy signal 321, for example, may be an interval from the planned transmission-start-timing 305 until the data-signal transmission start timing 532.

FIG. 5B is a diagram depicting a modification example of the transmission start timing of the terminals. In FIG. 5B, portions identical to those depicted in FIG. 5A are given the same reference numeral used n FIG. 5A and description thereof will be omitted hereinafter. In FIG. 5B, a case in which multiuser MIMO is used is described. In this case, the terminals 120, 130 are able to use the same bandwidth among the unlicensed bandwidth 200.

For example, description will be given concerning a case where the base station 110 has assigned the sub-band #1 to the uplink transmission of the terminal 120 and has further assigned the sub-band #1 to the uplink transmission of the terminal 130. In this case, as depicted in FIG. 5B, the terminal 130 performs carrier sensing in the sub-band #1 and transmission of the dummy signal 321 and the data signal 322. The base station 110 performs, in the sub-band #1, reception of the dummy signal 321 and the data signal 322 from the terminal 130.

Figure 6:
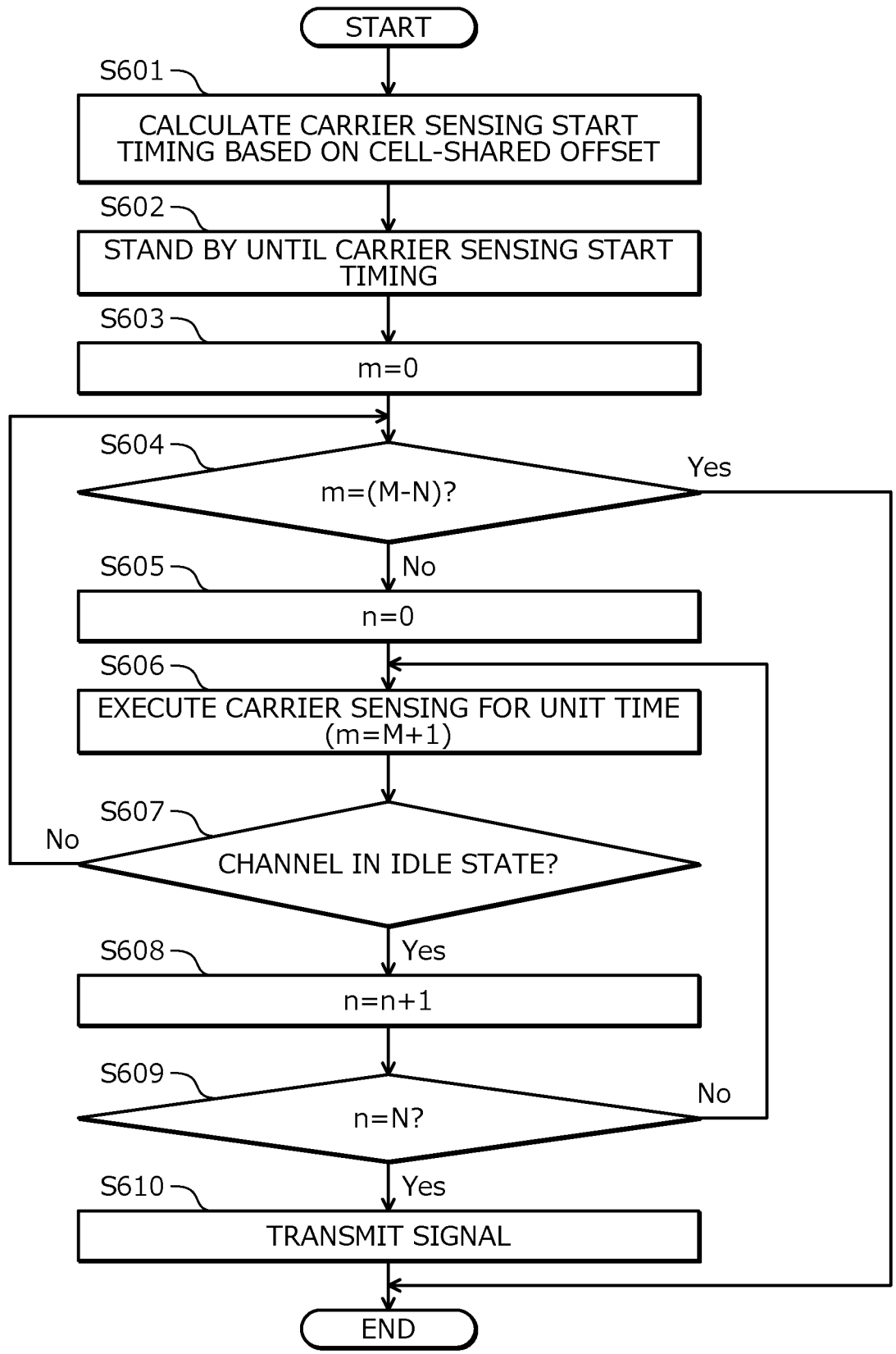
FIG. 6 is a flowchart of an example of processing by the terminals.

FIG. 6 is a flowchart of an example of processing by the terminals. Here, although processing by the terminal 120 will be described, processing by the terminal 130 is identical. The terminal 120 executes the steps depicted in FIG. 6, when transmitting an uplink data signal, for example.

First, the terminal 120 calculates the carrier sensing start timing based on the cell-shared offset (step S601). The terminal 120 stands by until the carrier sensing start timing calculated at step S601 (step S602).

Next, the terminal 120 initializes m (m=0) (step S603). "m" is a count value for counting the number of executions of carrier sensing per unit time. Next, the terminal 120 determines whether m equals M-N (step S604). "M" is the cell-shared offset and "N" is the specified idle period. Furthermore, the units of M and N are also the unit time of the carrier sensing.

At step S604, when m is equal to M-N (step S604: YES), the terminal 120 is able to determine that data signal transmission cannot be started until the next reference timing 301 of the base station 110, even when channel availability has been detected by carrier sensing. In this case, the terminal 120 ends the series of operations.

At step S604, when m is not equal to M-N (step S604: NO), the terminal 120 initializes n (n=0) (step S605). "n" is a count value for counting the number of times that an idle state of the channel (bandwidth) is consecutively detected by carrier sensing.

Next, the terminal 120 executes carrier sensing for the unit time (step S606). Further, the terminal 120 increments m (m=m+1). Next, the terminal 120 determines based on the result of carrier sensing at step S606, whether a channel is in an idle state (step S607). At step S607, the channel subject to idle state determination, for example, may be only the sub-band (the sub-band #1) assigned to the terminal 120 or may be the unlicensed bandwidth 200 entirely.

At step S607, if the channel is not in an idle state (step S607: NO), the terminal 120 returns to step S604. If the channel is in an idle state (step S607: YES), the terminal 120 increments n (n=n+1) (step S608).

Next, the terminal 120 determines whether n is equal to N (step S609). If n is not equal to N (step S609: NO), the terminal 120 returns to step S606. If n is equal to N (step S609: YES), the terminal 120 transmits a signal by the uplink (step S610), ending the series of operations. At step S610, for example, as depicted in FIG. 3, the terminal 120 first transmits a dummy signal and thereafter, transmits a data signal.

In the example depicted in FIG. 6, although a process of calculating the carrier sensing start timing when the terminal 120 transmits a signal has been described, the terminal 120 may calculate the carrier sensing start timing in advance based on the cell-shared offset.

Figure 7B:
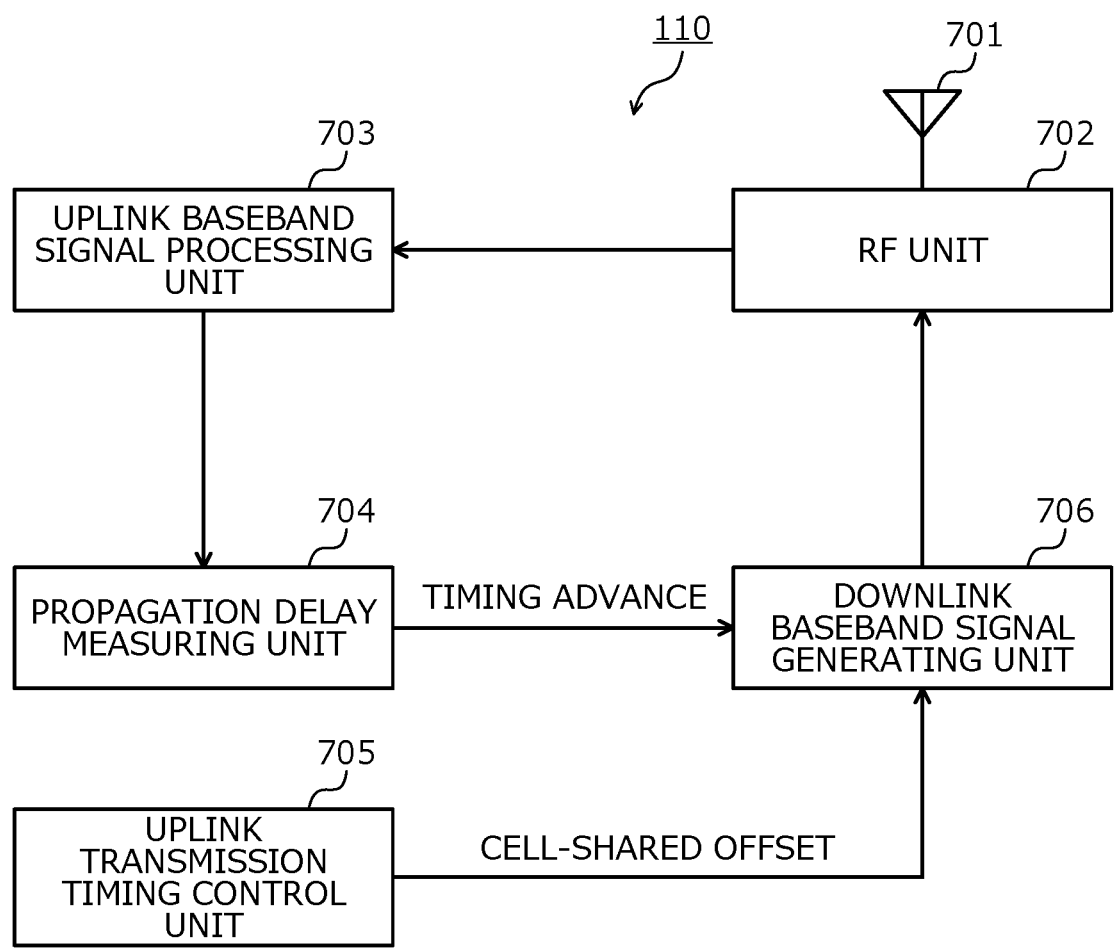
FIG. 7B is a diagram depicting an example of signal flow in the base station depicted in FIG. 7A.

FIG. 7A is a diagram depicting an example of the base station according to the embodiment. FIG. 7B is a diagram depicting an example of signal flow in the base station depicted in FIG. 7A. As depicted in FIGS. 7A and 7B, the base station 110 has an antenna 701, a RF unit 702, an uplink baseband signal processing unit 703, a propagation delay measuring unit 704, an uplink transmission timing control unit 705, and a downlink baseband signal generating unit 706.

The antenna 701 receives signals wirelessly transmitted from the terminals 120, 130 and outputs the signals to the RF unit 702. The antenna 701 further wirelessly transmits to the terminals 120, 130, signals output from the RF unit 702. The antenna 701 is not limited to a single antenna and may be multiple antennas. For example, when multiuser MIMO is performed, the antenna 701 may be multiple antennas supporting multiuser MIMO.

The RF unit 702 performs a RF reception process for uplink signals output from the antenna 701. The RF reception process by the RF unit 702, for example, includes amplification, frequency conversion from a radio frequency (RF) to a baseband, conversion from an analog signal to a digital signal, and the like. The RF unit 702 outputs to the uplink baseband signal processing unit 703, the signals subjected to the RF reception process.

Further, the RF unit 702 performs a RF transmission process for downlink signals output from the downlink baseband signal generating unit 706. The RF transmission process by the RF unit 702, for example, includes conversion from a digital signal to an analog signal, frequency conversion from a baseband to an RF band, amplification, and the like. The RF unit 702 outputs to the antenna 701, the signals subjected to the RF transmission process.

The uplink baseband signal processing unit 703 performs a baseband signal process for uplink signals output from the RF unit 702. The uplink baseband signal processing unit 703 outputs to the propagation delay measuring unit 704, measurement-use signals included in data obtained by the baseband signal process. The measurement-use signal output from the uplink baseband signal processing unit 703 to the propagation delay measuring unit 704, for example, includes an uplink reference signal (RS), a Random Access Channel (RACH) preamble, etc. from the terminals 120, 130.

The propagation delay measuring unit 704 measures the propagation delays between the base station 110 and the terminals 120, 130, based on the measurement-use signal output from the uplink baseband signal processing unit 703. For example, the propagation delay measuring unit 704 measures the propagation delay between the base station 110 and the terminal 120, based on the RS, the RACH preamble, etc. transmitted from the terminal 120. Further, the propagation delay measuring unit 704 measures the propagation delay between the base station 110 and the terminal 130, based on the RS, RACH preamble, etc. output from the terminal 130.

The propagation delay measuring unit 704, with respect to each of the terminals 120, 130, outputs to the downlink baseband signal generating unit 706, a timing advance that is based on the measured propagation delay values. The timing advance, for example, is information indicating a value that is two times the measured propagation delay.

The uplink transmission timing control unit 705 controls the transmission timing of uplinks from the terminals 120, 130 to the base station 110. For example, the uplink transmission timing control unit 705 determines the cell-shared offset between the carrier sensing start timing and the reference timing and notifies the downlink baseband signal generating unit 706 of the determined cell-shared offset. The cell-shared offset determined by the uplink transmission timing control unit 705, for example, is the cell-shared offset 302 depicted in FIG. 3.

The downlink baseband signal generating unit 706 generates downlink baseband signals from the base station 110 to the terminals 120, 130. The signals generated by the downlink baseband signal generating unit 706 include the timing advance output from the propagation delay measuring unit 704 and the cell-shared offset notified by the uplink transmission timing control unit 705. The downlink baseband signal generating unit 706 outputs the generated signal to the RF unit 702.

The control unit 111 depicted in FIGS. 1A and 1B, for example, may be realized by the antenna 701, the RF unit 702, the uplink transmission timing control unit 705, and the downlink baseband signal generating unit 706. The receiving unit 112 depicted in FIGS. 1A and 1B, for example, may be realized by the antenna 701, the RF unit 702, and the uplink baseband signal processing unit 703.

FIG. 7C is a diagram depicting an example of hardware configuration of the base station. The base station 110 depicted in FIGS. 7A and 7B, for example, may be realized by a communications apparatus 730 depicted in FIG. 7C. The communications apparatus 730 includes a processor 731, a main memory apparatus 732, and an auxiliary memory apparatus 733, a network interface 734, a transceiver 735, and an antenna 736. The processor 731, the main memory apparatus 732, the auxiliary memory apparatus 733, the network interface 734, and the transceiver 735 are connected by a bus 739.

The processor 731 governs overall control of the communications apparatus 730. The processor 731, for example, may be realized by a central processing unit (CPU). The main memory apparatus 732, for example, is used as a work area of the processor 731. The main memory apparatus 732, for example, may be realized by random access memory (RAM).

The auxiliary memory apparatus 733, for example, may be non-volatile memory such as a magnetic disk, an optical disk, flash memory, and the like. The auxiliary memory apparatus 733 stores various programs that cause the communications apparatus 730 to operate. The programs stored by the auxiliary memory apparatus 733 are loaded onto the main memory apparatus 732 and are executed by the processor 731.

The network interface 734, for example, is a communications interface that performs wireless or wired communication with external devices of the communications apparatus 730 (e.g., core network, higher device of the base station 110, etc.). The network interface 734 is controlled by the processor 731.

The transceiver 735 is a communications interface that uses the antenna 736 and performs wireless communication with other communications apparatuses (e.g., the terminals 120, 130). The transceiver 735 is controlled by the processor 731.

The antenna 701 depicted in FIGS. 7A and 7B, for example, may be realized by the antenna 736. The RF unit 702 depicted in FIGS. 7A and 7B, for example, may be realized by the transceiver 735.

The uplink baseband signal processing unit 703, the propagation delay measuring unit 704, the uplink transmission timing control unit 705, and the downlink baseband signal generating unit 706 depicted in FIGS. 7A and 7B, for example, may be realized by the processor 731.

Figure 8B:
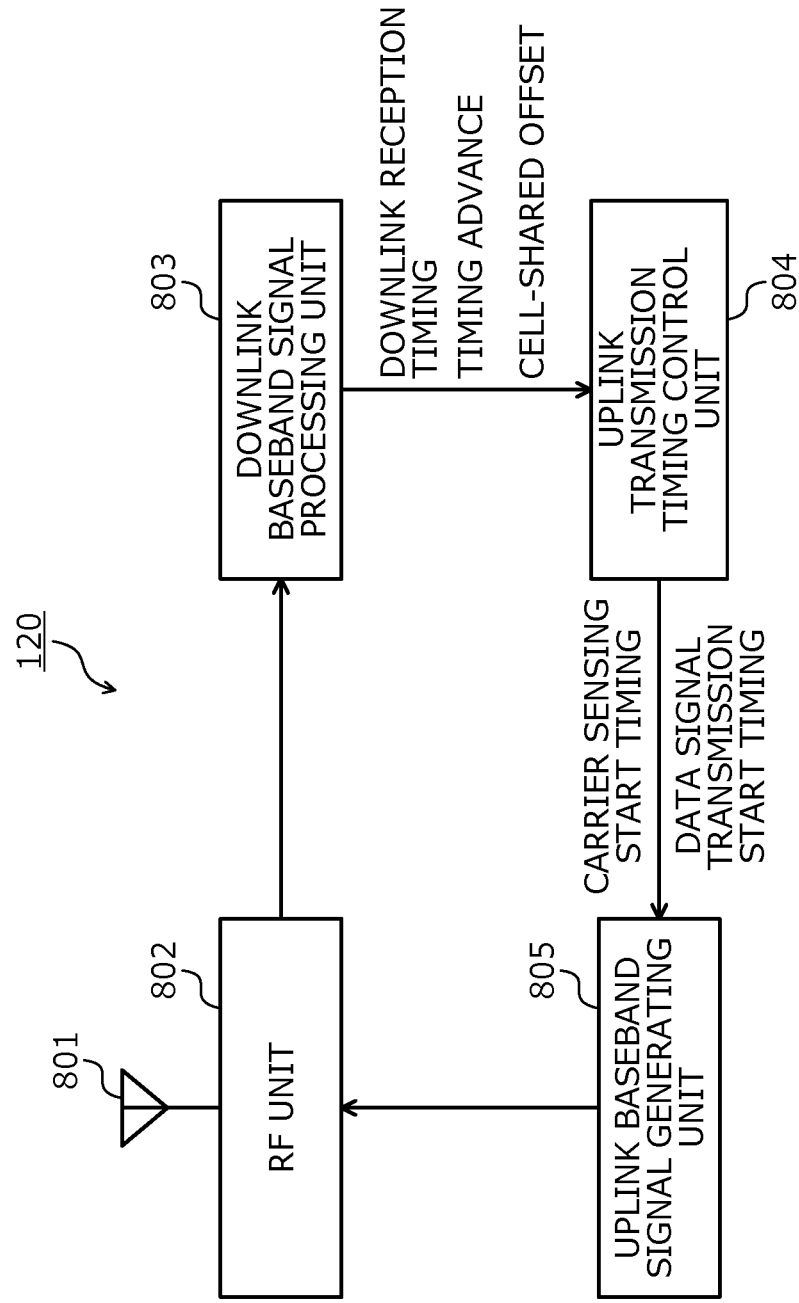
FIG. 8B is a diagram depicting an example of signal flow in the terminal depicted in FIG. 8A.

FIG. 8A is a diagram depicting an example of the terminal according to the embodiment. FIG. 8B is a diagram depicting an example of signal flow in the terminal depicted in FIG. 8A. In FIGS. 8A and 8B, although configuration of the terminal 120 will be described, the configuration of the terminal 130 is identical.

As depicted in FIGS. 8A and 8B, the terminal 120 includes an antenna 801, a RF unit 802, a downlink baseband signal processing unit 803, an uplink transmission timing control unit 804, and an uplink baseband signal generating unit 805.

The antenna 801 receives signals wirelessly transmitted from the base station 110 and outputs the signals to the RF unit 802. The antenna 801 further wirelessly transmits to the base station 110, signals output from the RF unit 802.

The RF unit 802 performs a RF reception process for uplink signals output from the antenna 801. The RF reception process by the RF unit 802 includes, for example, amplification, frequency conversion from a RF band to a baseband, conversion from an analog signal to a digital signal, and the like. The RF unit 802 outputs to the downlink baseband signal processing unit 803, the signals subjected to the RF reception process.

Further, the RF unit 802 performs a RF transmission process for uplink signals output from the uplink baseband signal generating unit 805. The RF transmission process by the RF unit 802 includes, for example, conversion from a digital signal to an analog signal, frequency conversion from a baseband to a RF band, amplification, and the like. The RF unit 802 outputs to the antenna 801, the signal subject to the RF transmission process.

The downlink baseband signal processing unit 803 performs a baseband signal process for downlink signals output from the RF unit 802. The downlink baseband signal processing unit 803 outputs to the uplink transmission timing control unit 804, control information obtained by the baseband signal process.

The control information output from the downlink baseband signal processing unit 803 to the uplink transmission timing control unit 804 includes, for example, information such as a downlink reception timing, a timing advance from the base station 110, a cell-shared offset from the base station 110, and the like. The downlink reception timing, for example, is the timing of subframe borders 511, 512 depicted in FIG. 5A. The timing advance, for example, is information indicating a value that is two times the propagation delay T1 depicted in FIG. 5A. The cell-shared offset, for example, is the cell-shared offset 302 depicted in FIGS. 3 and 5A.

The uplink transmission timing control unit 804 determines a carrier sensing start timing and an uplink transmission start timing, based on the control information output from the downlink baseband signal processing unit 803.

The carrier sensing start timing determined by the uplink transmission timing control unit 804, for example, is the carrier sensing start timing 303 depicted in FIG. 5A. For example, the uplink transmission timing control unit 804 determines the carrier sensing start timing based on the cell-shared offset, the propagation delay indicated by the timing advance, and a subframe border that is based on a downlink reception timing. The uplink transmission timing control unit 804 notifies the uplink baseband signal generating unit 805 of the determined carrier sensing start timing.

A transmission start timing determined by the uplink transmission timing control unit 804, for example, is the data-signal transmission start timing 531 depicted in FIG. 5A. For example, the uplink transmission timing control unit 804 determines the data-signal transmission start timing, based on the propagation delay indicated by the timing advance and a subframe border that is based on the downlink reception timing. The uplink transmission timing control unit 804 notifies the uplink baseband signal generating unit 805 of the determined data-signal transmission start timing.

The uplink baseband signal generating unit 805 performs carrier sensing control and uplink baseband signal generation, based on the timings notified by the uplink transmission timing control unit 804. The uplink baseband signal generating unit 805 outputs the generated signals to the RF unit 802.

For example, the uplink baseband signal generating unit 805 controls the RF unit 802 to perform carrier sensing at the carrier sensing start timing notified by the uplink transmission timing control unit 804. The uplink baseband signal generating unit 805 starts wireless signal transmission, when, as a result of carrier sensing, idle state for the specified idle period (the specified idle period 304 depicted in FIG. 5A) is detected.

For example, the uplink baseband signal generating unit 805 first transmits a dummy signal (the dummy signal 311 depicted in FIG. 5A). The uplink baseband signal generating unit 805 transmits a data signal (the data signal 312 depicted in FIG. 5A) at the data-signal transmission start timing notified by the uplink transmission timing control unit 804.

The detecting unit 121 and the transmitting unit 122 depicted in FIGS. 1A and 1B, for example, may be realized by the antenna 801, the RF unit 802, the uplink transmission timing control unit 804, and the uplink baseband signal generating unit 805.

Figure 8C:
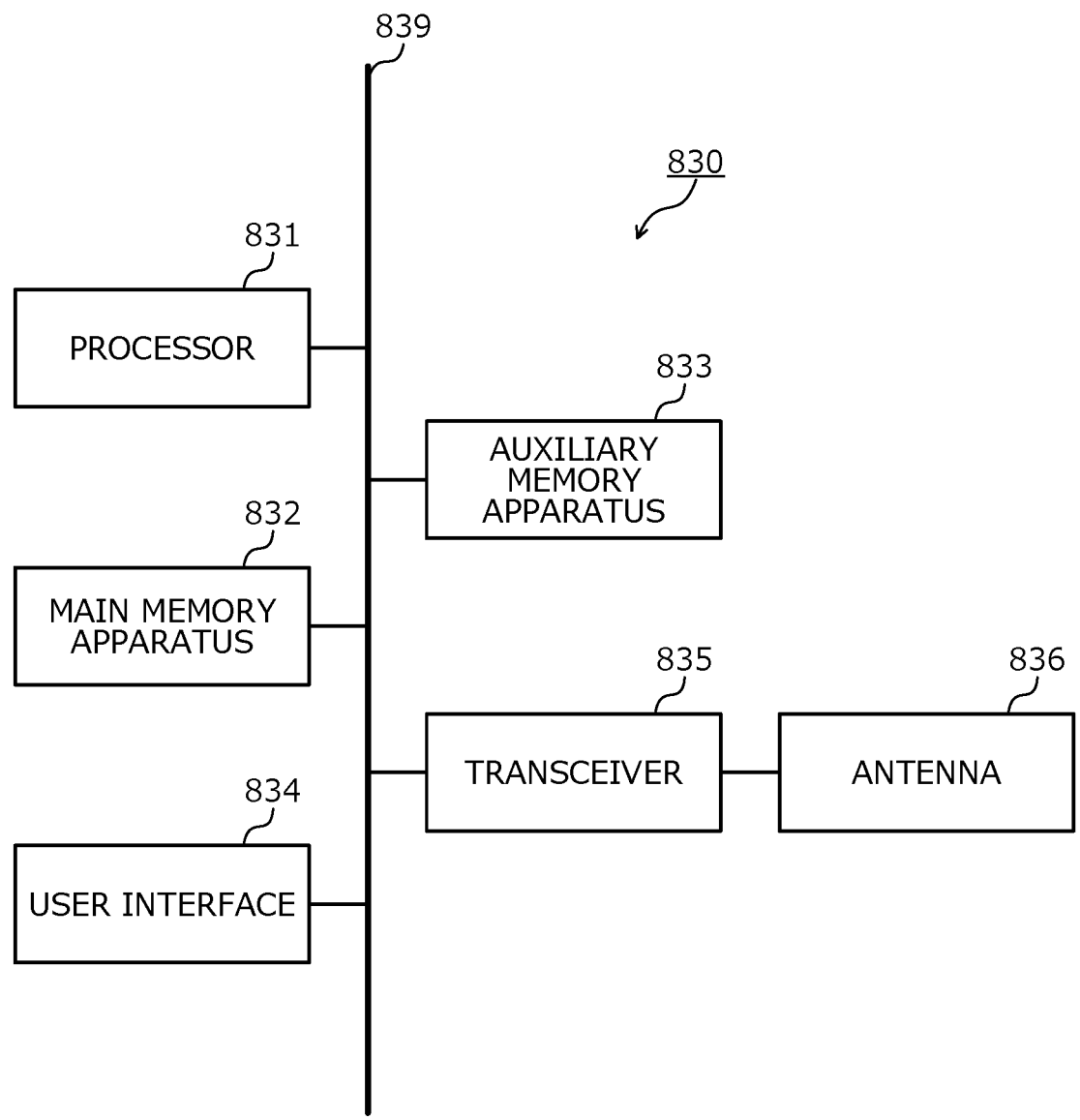
FIG. 8C is a diagram depicting an example of hardware configuration of the terminal.

FIG. 8C is a diagram depicting an example of hardware configuration of the terminal. The terminal 120 depicted in FIGS. 8A and 8B, for example, may be realized by a communications apparatus 830 depicted in FIG. 8C. The communications apparatus 830 includes a processor 831, a main memory apparatus 832, an auxiliary memory apparatus 833, a user interface 834, a transceiver 835, and an antenna 836. The processor 831, the main memory apparatus 832, the auxiliary memory apparatus 833, the user interface 834, and the transceiver 835 are connected by a bus 839.

The processor 831 governs overall control of the communications apparatus 830. The processor 831, for example, may be realized by a CPU. The main memory apparatus 832, for example, is used as a work area of the processor 831. The main memory apparatus 832, for example, may be realized by RAM.

The auxiliary memory apparatus 833, for example, is non-volatile memory such as a magnetic disk, an optical disk, flash memory, and the like. The auxiliary memory apparatus 833 stores various programs that cause the communications apparatus 830 to operate. The programs stored by the auxiliary memory apparatus 833 are loaded onto the main memory apparatus 832 and are executed by the processor 831.

The user interface 834, for example, may include an input device that receives operational input from a user, an output device that outputs information to the user. The input device may be realized by, for example, a key (e.g., a keyboard), a remote controller, or the like. The output device may be realized by, for example, a display, a speaker, or the like. Further, the input device and the output device may be realized by a touch panel or the like. The user interface 834 is controlled by the processor 831.

The transceiver 835 is a communications interface that uses the antenna 836 and performs wireless communication with other communications apparatuses (e.g., the base station 110). The transceiver 835 is controlled by the processor 831.

The antenna 801 depicted in FIGS. 8A and 8B may be realized by, for example, the antenna 836. The RF unit 802 depicted in FIGS. 8A and 8B may be realized by, for example, the transceiver 835. The downlink baseband signal processing unit 803, the uplink transmission timing control unit 804, and the uplink baseband signal generating unit 805 depicted in FIGS. 8A and 8B may be realized by, for example, the processor 831.

Although a configuration in which the base station 110 notifies the terminals 120, 130 of the cell-shared offset has been described, configuration may be such that the base station 110 does not notify the terminals 120, 130 of the cell-shared offset. In this case, the terminals 120, 130, for example, use a recognized parameter common within the cell of the base station 110 to calculate the cell-shared offset. As a result, even without the base station 110 notifying the terminals 120, 130 of the cell-shared offset, the terminals 120, 130 may calculate the cell-shared offset.

Figure 9A:
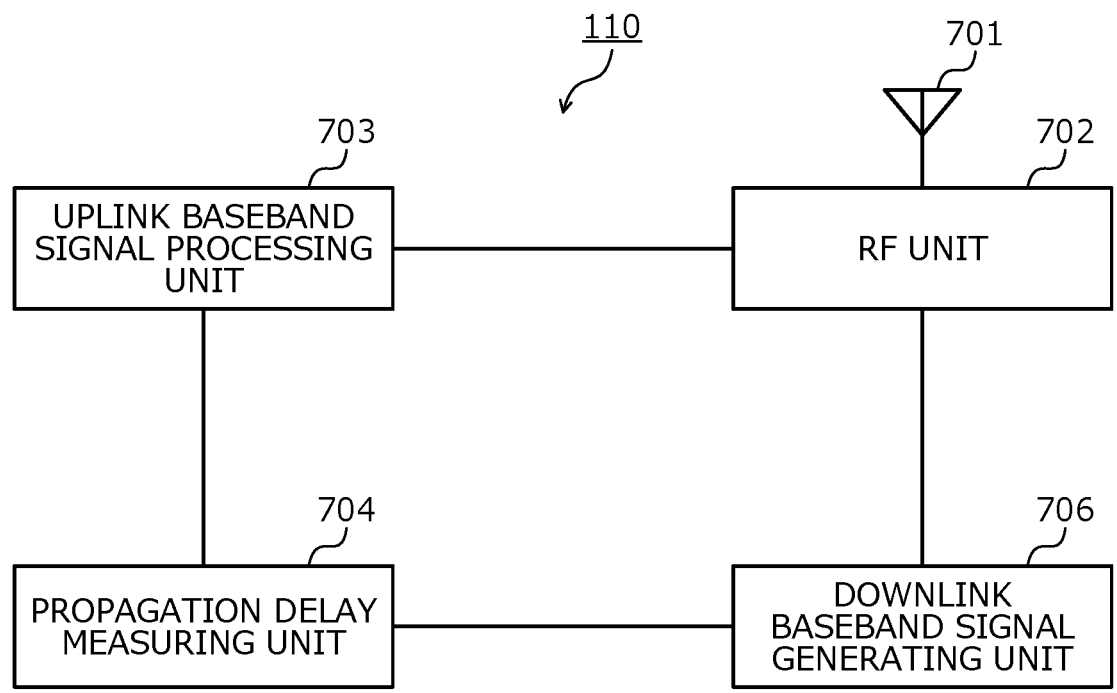
FIG. 9A is a diagram depicting an example of the base station according to a modification example.
Figure 9B:
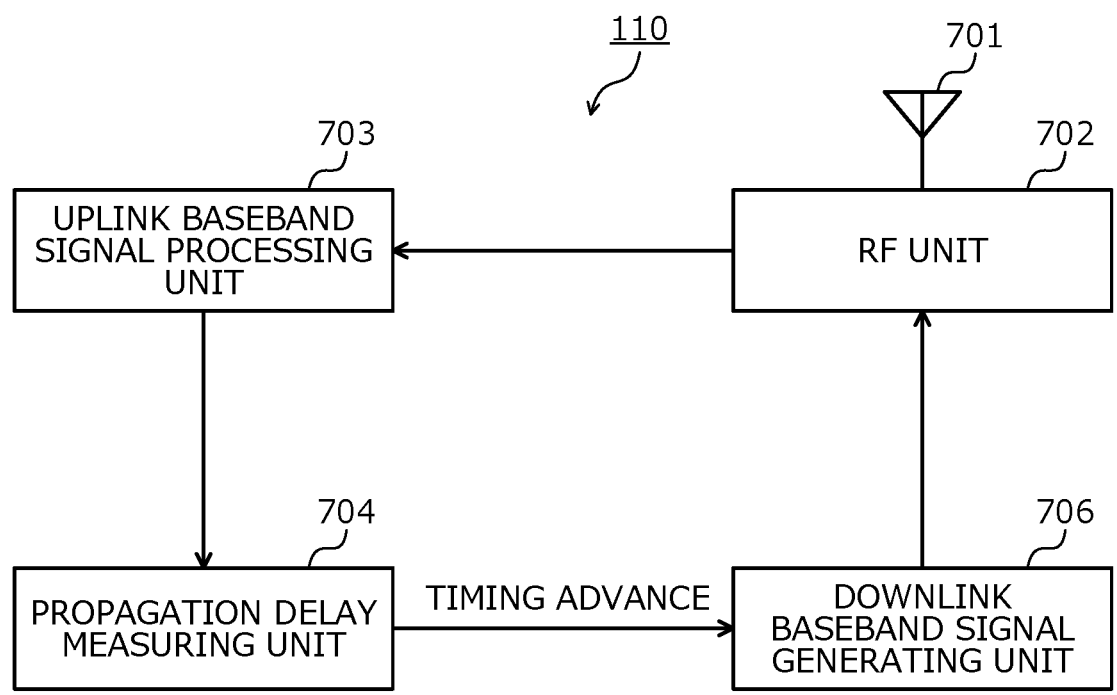
FIG. 9B is a diagram depicting an example of signal flow at the base station depicted in FIG. 9A.

FIG. 9A is a diagram depicting an example of the base station according to a modification example. FIG. 9B is a diagram depicting an example of signal flow at the base station depicted in FIG. 9A. In FIGS. 9A and 9B, portions identical to those depicted in FIGS. 7A and 7B are given the same reference numerals used in FIGS. 7A and 7B and description thereof is omitted hereinafter. As depicted in FIGS. 9A and 9B, the base station 110 according to the modification example may be configured to omit the uplink transmission timing control unit 705 in the configuration depicted in FIGS. 7A and 7B.

FIG. 10 is a diagram depicting an example of signal flow in the terminal according to the modification example. In FIG. 10, portions identical to those depicted in FIGS. 8A and 8B are given the same reference numerals used in FIGS. 8A and 8B and description thereof is omitted hereinafter. Configuration of the terminal 120 according to the modification example is the same as the configuration of the terminal 120 depicted in FIG. 8A. However, as depicted in FIG. 10, in the terminal 120 according to the modification example, the cell-shared offset is not included in the control information output from the downlink baseband signal processing unit 803 to the uplink transmission timing control unit 804.

The uplink transmission timing control unit 804, for example, calculates the cell-shared offset based on at least one of the subframe number and the cell number. As a result, the terminals 120, 130 calculate the cell-shared offset, enabling the transmission timings of the wireless signals by the terminals 120, 130 to be made to coincide.

As described, according to the wireless communications system, the base station, the terminal, and the processing method, uplink user multiplexing in a shared bandwidth becomes possible and throughput may be improved.

For example, conventionally, under LTE, to cope with traffic increases, data offloading from an exclusive bandwidth (licensed bandwidth) using a non-licensed bandwidth has been proposed. A non-licensed bandwidth, for example, is called an unlicensed bandwidth or a common-use bandwidth (shared bandwidth).

For example, a Licensed-Assisted Carrier Aggregation scheme of transmitting control information such as a response signal (ACK/NACK) by an exclusive bandwidth and transmitting data by an unlicensed bandwidth is under investigation.

In an unlicensed bandwidth, in addition to coexistence between LTE-u systems, coexistence with other wireless systems such as that of a WLAN is necessary. Under radio laws of Japan and Europe, before the transmission of a wireless signal, it has to be confirmed by carrier sensing that a channel is not being used by another wireless system (is in an idle state).

In practice, in an unlicensed bandwidth, in a WLAN, time-division user multiplexing is performed in which a single user (station) uses the entire bandwidth. In contrast, under LTE practically implemented in a licensed bandwidth, user multiplexing is not only performed by time division but also by frequency division. Furthermore, spatial-division user multiplexing by MIMO may be performed.

In other words, under LTE, although user multiplexing is performed in the same bandwidth, a method related to realizing uplink transmission in an unlicensed bandwidth has not been established. For example, a case where random backoff (Random Backoff) is performed according to terminal after confirming non-usage (idle state) for a specified idle period like a WLAN will be described. In this case, a terminal for which the backoff interval is long may detect by carrier sensing, a wireless signal from a terminal for which the backoff interval is short and may become unable to transmit a wireless signal.

For example, when a terminal performs carrier sensing for the entire unlicensed bandwidth (for example, a 20 [MHz] width), detection including sub-bands other than the planned sub-band for the terminal to perform transmission is performed. Therefore, consequent to wireless signals transmitted by other terminals on other sub-bands, the channel is likely to be determined to be busy and the terminal may become unable to transmit a wireless signal.

Even in a case where carrier sensing is performed only in the planned sub-band for wireless signal transmission by the terminal, the channel may be determined to be in a busy state consequent to leaked power from a wireless signal transmitted by a terminal on an adjacent sub-band. Therefore, a situation in which wireless signal transmission cannot be performed may occur.

Further, when multiuser MIMO is used, since spatial multiplexing on the same bandwidth is performed, the channel may be determined to be busy consequent to a signal of a multiplexing counterpart terminal, resulting in a situation in which wireless signal transmission cannot be performed.

In contrast, according to the embodiment, for example, the uplink transmission start time for terminals in the same cell may be made to be the same. For example, the carrier sensing start timing and the transmission start timing for wireless signals are determined based on a shared offset from a reference timing of each cell, enabling the uplink transmission start times to be made the same.

As a result, in an unlicensed bandwidth, carrier sensing according to terminal is performed and the wireless signal transmission timing at the terminals may be made to be the same. Therefore, uplink user multiplexing in a single cell becomes possible, enabling throughput to be improved.

However, in a system that uses a shared bandwidth such as an unlicensed bandwidth, for example, the need to confirm the bandwidth before transmitting signals and the temporal overlap of wireless signal transmission by multiple terminals were not anticipated. Therefore, user multiplexing by frequency-division is difficult and uplink throughput may not be improved by user multiplexing.

According to one aspect of the present invention, an effect is achieved in that uplink user multiplexing in a shared bandwidth is enabled and throughput can be improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

In relation to the embodiments, the following Notes are further disclosed.

Note 1. A first wireless communications system configured to share a predetermined bandwidth with another wireless communications system, the first wireless communications system comprising: a base station; and a plurality of terminals connected to the base station. Each terminal of the plurality of terminals starts a process of detecting a wireless signal of the predetermined bandwidth, at a predetermined timing common among the plurality of terminals. The each terminal of the plurality of terminals starts wireless signal transmission, using among bandwidths included in the predetermined bandwidth, a same bandwidth or a mutually different bandwidth at a timing when a state in which no wireless signal of the predetermined bandwidth is detected by the process has continued for a predetermined period that is common among the plurality of terminals.

Note 2. The wireless communications system according to Note 1, where the each terminal of the plurality of terminals calculates the predetermined timing based on a timing at which the each terminal received a wireless signal from the base station and information indicating a propagation delay between the each terminal and the base station, and starts the process at the calculated predetermined timing.

Note 3. The wireless communications system according to Note 1 or 2, where the each terminal of the plurality of terminals, when the state in which no wireless signal of the predetermined bandwidth is detected by the process has continued for the predetermined period, transmits a data signal to the base station so as to be received at a reception timing of the base station in the predetermined bandwidth, the each terminal transmitting the data signal based on information indicating a propagation delay between the each terminal and the base station. The each terminal of the plurality of terminals transmits a dummy signal or a preamble from the timing when the state in which no wireless signal of the predetermined bandwidth is detected by the process has continued for the predetermined period, the each terminal transmitting the dummy signal or the preamble until the data signal is transmitted.

Note 4. The wireless communications system according to one of Notes 1 to 3, where the base station transmits to the plurality of terminals, a parameter for calculating the predetermined timing. The each terminal of the plurality of terminals starts the process at the predetermined timing calculated based on a predetermined reference timing and the parameter transmitted from the base station.

Note 5. The wireless communications system according to Note 4, where the base station transmits to the plurality of terminals, the parameter that is determined based on a random number.

Note 6. The wireless communications system according to one of Notes 1 to 3, where the each terminal of the plurality of terminals calculates the predetermined timing based on information shared among the plurality of terminals, and starts the process at the calculated predetermined timing.

Note 7. The wireless communications system according to Note 6, where the information shared among the plurality of terminals includes identification information of a cell of the base station.

Note 8. The wireless communications system according to Note 6 or 7, where the information shared among the plurality of terminals includes identification information of a subframe for performing the process.

Note 9. The wireless communications system according to one of Notes 1 to 8, where the process of detecting a wireless signal of the predetermined bandwidth is a process of detecting a wireless signal in a bandwidth that among the bandwidths of the predetermined bandwidth, the each terminal uses in the wireless signal transmission.

Note 10. The wireless communications system according to one of Notes 1 to 9, where the process of detecting a wireless signal of the predetermined bandwidth is a process of detecting a wireless signal in the predetermined bandwidth entirely.

Note 11. A base station of a wireless communications system configured to share a predetermined bandwidth with another wireless communications system, the base station comprising: a control unit configured to transmit to a plurality of terminals connected to the base station, a parameter for calculating a predetermined timing that is common among the plurality of terminals, the control unit thereby causing each terminal of the plurality of terminals to execute a process of starting a process of detecting a wireless signal of the predetermined bandwidth at the predetermined timing and starting wireless signal transmission using among bandwidths included in the predetermined bandwidth, a same bandwidth or a mutually different bandwidth at a timing when a state in which no wireless signal of the predetermined bandwidth is detected by the process of detecting has continued for a predetermined period that is common among the plurality of terminals; and a receiving unit configured to receive wireless signals transmitted from the plurality of terminals.

Note 12. A terminal of a wireless communications system configured to share a predetermined bandwidth with a second wireless communications system, the terminal comprising: a detecting unit configured to start at a predetermined timing common to a second terminal connected to a base station to which the terminal is connected, a process of detecting a wireless signal of the predetermined bandwidth; and a transmitting unit configured to start wireless signal transmission using a bandwidth included in the predetermined bandwidth, the transmitting unit starting the wireless signal transmission at a timing when a state in which no wireless signal of the predetermined bandwidth is detected by the detecting unit has continued for a predetermined period that is common to the second terminal.

Note 13. A processing method of a base station of a wireless communications system configured to share a predetermined bandwidth with another wireless communications system, the processing method comprising: transmitting, by the base station to a plurality of terminals connected to the base station, a parameter for calculating a predetermined timing that is common among the plurality of terminals, the base station thereby causing each terminal of the plurality of terminals to execute a process of starting a process of detecting a wireless signal of the predetermined bandwidth at the predetermined timing and starting wireless signal transmission using among bandwidths included in the predetermined bandwidth, a same bandwidth or a mutually different bandwidth at a timing when a state in which no wireless signal of the predetermined bandwidth is detected by the process of detecting has continued for a predetermined period that is common among the plurality of terminals; and receiving, by the base station, wireless signals transmitted from the plurality of terminals.

Note 14. A processing method of a terminal of a wireless communications system configured to share a predetermined bandwidth with another wireless communications system, the processing method comprising: starting, by the terminal, a process of detecting a wireless signal of the predetermined bandwidth, at a predetermined timing common to a second terminal connected to a base station to which the terminal is connected; and starting, by the terminal, wireless signal transmission using a bandwidth included in the predetermined bandwidth, the terminal starting the wireless signal transmission at a timing when a state in which no wireless signal of the predetermined bandwidth is detected by the process of detecting has continued for a predetermined period that is common to the second terminal.

What is claimed is:

1. A wireless communications system configured to use a predetermined bandwidth of a shared bandwidth, the wireless communications system comprising:
a base station configured to transmit a control signal that includes information indicating an offset time from a reference timing and a timing advance; and
a terminal connected to the base station and configured to:
receive the control signal and the timing advance from the base station;
calculate a transmission start timing according to the offset time and the timing advance;
perform a process of detecting a wireless signal of the predetermined bandwidth in a standard period before the transmission start timing;
start transmission of a dummy signal or a predetermined wireless signal having a length according to the offset time and the timing advance from the transmission start timing when no wireless signal of the predetermined bandwidth is detected in the process; and
start transmission of a data signal after the transmission of the dummy signal or the predetermined wireless signal, wherein the transmission start timing is a timing at which the terminal is allowed to start transmission of wireless signals.

2. The wireless communications system according to claim 1, wherein the base station transmits the control signal using a PDCCH or Radio Resource Control signal.

3. The wireless communications system according to claim 1, wherein
the terminal starts transmission from the transmission start timing using a portion of the predetermined bandwidth.

4. The wireless communications system according to claim 1, wherein the base station determines based on a random number, a parameter for calculating a timing of starting the process performed by the terminal, and transmits the parameter to the terminal.

5. The wireless communications system according to claim 1, wherein the process of detecting a wireless signal of the predetermined bandwidth is a process of detecting a wireless signal in the entire predetermined bandwidth.

6. A base station of a wireless communications system configured to use a predetermined bandwidth of a shared bandwidth, the base station comprising:
a transmitter configured to transmit to a terminal connected to the base station, a control signal that includes information indicating an offset time from a reference timing and a timing advance; and
a receiver configured to receive a wireless signal transmitted from the terminal that starts transmission from a transmission start timing according to the offset time, wherein
the terminal calculates a transmission start timing according to the offset time and the timing advance, performs a process of detecting a wireless signal of the predetermined bandwidth in a standard period before the transmission start timing, starts transmission of a dummy signal or a predetermined wireless signal having a length according to the offset time and the timing advance from the transmission start timing when no wireless signal of the predetermined bandwidth is detected in the process, and starts transmission of a data signal after the transmission of the dummy signal or a predetermined wireless signal, wherein the transmission start timing is a timing at which the terminal is allowed to start transmission of wireless signals.

7. The base station according to claim 6, wherein the transmitter transmits the control signal using a PDCCH or Radio Resource Control signal.

8. A terminal of a wireless communications system configured to use a predetermined bandwidth of a shared bandwidth, the terminal comprising:
a receiver configured to receive from a base station, a control signal that includes information indicating an offset time from a reference timing and a timing advance; and
a controller configured to:
calculate a transmission start timing according to the offset time and the timing advance;
perform a process of detecting a wireless signal of the predetermined bandwidth in a standard period before the transmission start timing;
start transmission of a dummy signal or a predetermined wireless signal having a length according to the offset time and the timing advance from the transmission start timing when no wireless signal of the predetermined bandwidth is detected in the process; and
start transmission of a data signal after the transmission of the dummy signal or the predetermined wireless signal, wherein the transmission start timing is a timing at which the terminal is allowed to start transmission of wireless signals.

9. The terminal according to claim 8, wherein the receiver receives the control signal using a PDCCH or Radio Resource Control signal.

10. The terminal according to claim 8, wherein the controller starts transmission from the transmission start timing using a portion of the predetermined bandwidth.

* * * * *